(12) United States Patent
Yoneyama

(10) Patent No.: US 11,720,299 B2
(45) Date of Patent: Aug. 8, 2023

(54) PRINTING APPARATUS, CONTROL METHOD FOR THE PRINTING APPARATUS, AND STORAGE MEDIUM FOR CONTROLLING A COPY PROCESS

(71) Applicant: CANON KABUSHIKI KAISHA, Tokyo (JP)

(72) Inventor: Hiroshi Yoneyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/102,187

(22) Filed: Nov. 23, 2020

(65) Prior Publication Data

US 2021/0072934 A1 Mar. 11, 2021

Related U.S. Application Data

(63) Continuation of application No. 16/423,807, filed on May 28, 2019, now Pat. No. 10,877,704, which is a continuation of application No. 15/061,763, filed on Mar. 4, 2016, now Pat. No. 10,331,387.

(30) Foreign Application Priority Data

Mar. 12, 2015 (JP) ................................. 2015-049973

(51) Int. Cl.
*G06K 15/00* (2006.01)
*G06F 3/12* (2006.01)
*H04N 1/00* (2006.01)
*G03G 15/00* (2006.01)

(52) U.S. Cl.
CPC .......... *G06F 3/1215* (2013.01); *G03G 15/50* (2013.01); *G03G 15/6555* (2013.01); *G03G 15/6564* (2013.01); *H04N 1/00708* (2013.01); *H04N 1/00734* (2013.01); *G06F 3/1213* (2013.01); *G06F 3/1244* (2013.01)

(58) Field of Classification Search
None
See application file for complete search history.

(56) References Cited

U.S. PATENT DOCUMENTS 4,811,053 A * 3/1989 Ito ........................ G03G 15/502
399/81
7,843,578 B2 * 11/2010 Nonaka .............. H04N 1/00135
358/1.13
8,432,586 B2 * 4/2013 Hamano .................. H04N 1/40
358/505

(Continued)

*Primary Examiner* — Dung D Tran
(74) *Attorney, Agent, or Firm* — Canon U.S.A., Inc., IP Division

(57) ABSTRACT

Sheet feeding has been started after storing image data for one page of a document. A control method for a printing apparatus includes feeding a sheet from a sheet holding unit by a feeding unit, reading an image of a document by a reading unit, storing image data of the document read by the reading unit in a storing unit, and reading out, before image data for one page of the document is stored in the storing unit, the image data of the document from the storing unit and printing, by a printing unit, the image based on the read image data to the sheet fed from the sheet holding unit by the feeding unit, in which the feeding unit is able to start to feed the sheet from the sheet holding unit before the image data for the one page of the document is stored in the storing unit.

7 Claims, 19 Drawing Sheets

(56) References Cited

U.S. PATENT DOCUMENTS

| | | | | |
|---|---|---|---|---|
| 2002/0048036 A1* | 4/2002 | Nakagawa | ............ | G06F 3/1273 |
| | | | | 358/1.14 |
| 2005/0185199 A1* | 8/2005 | Ono | ................... | G03G 15/5025 |
| | | | | 358/1.1 |
| 2006/0065720 A1* | 3/2006 | Asako | ................... | G06Q 30/04 |
| | | | | 235/382 |
| 2006/0132821 A1* | 6/2006 | Nonaka | .............. | H04N 1/00127 |
| | | | | 358/1.13 |
| 2007/0091348 A1* | 4/2007 | Asaka | ............... | H04N 1/00832 |
| | | | | 358/1.14 |
| 2007/0229874 A1* | 10/2007 | Hamada | ................ | G06F 3/1219 |
| | | | | 358/1.14 |
| 2008/0063423 A1* | 3/2008 | Matoba | ................... | G03G 15/50 |
| | | | | 399/80 |
| 2008/0246993 A1* | 10/2008 | Murakami | ............ | G06F 3/1207 |
| | | | | 358/1.15 |
| 2012/0327453 A1* | 12/2012 | Katahira | ............... | G06F 21/608 |
| | | | | 358/1.14 |
| 2014/0036289 A1* | 2/2014 | Muroi | ................ | H04N 1/32443 |
| | | | | 358/1.13 |
| 2016/0170692 A1* | 6/2016 | Osada | ................... | H04N 1/2104 |
| | | | | 358/1.15 |

* cited by examiner

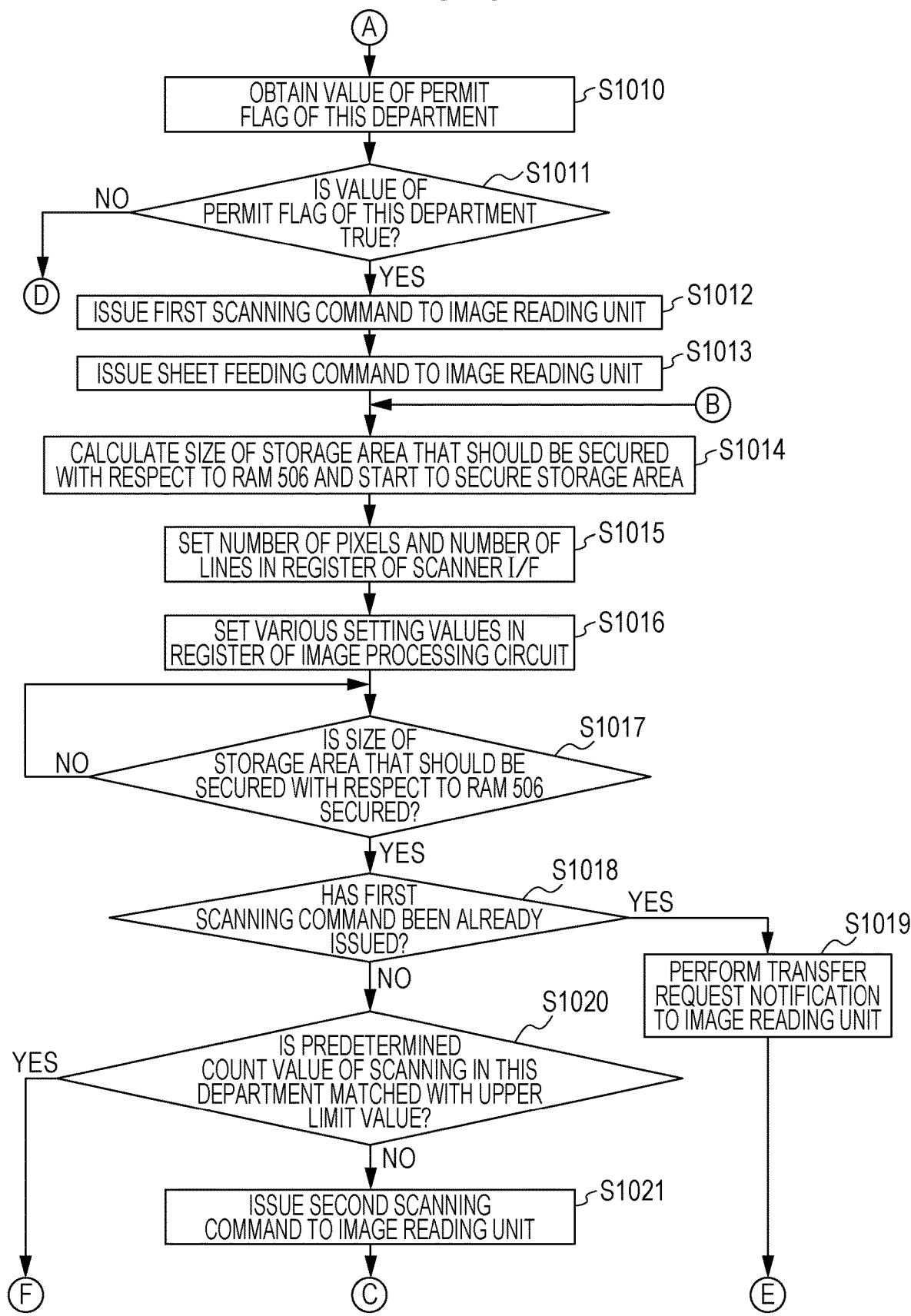

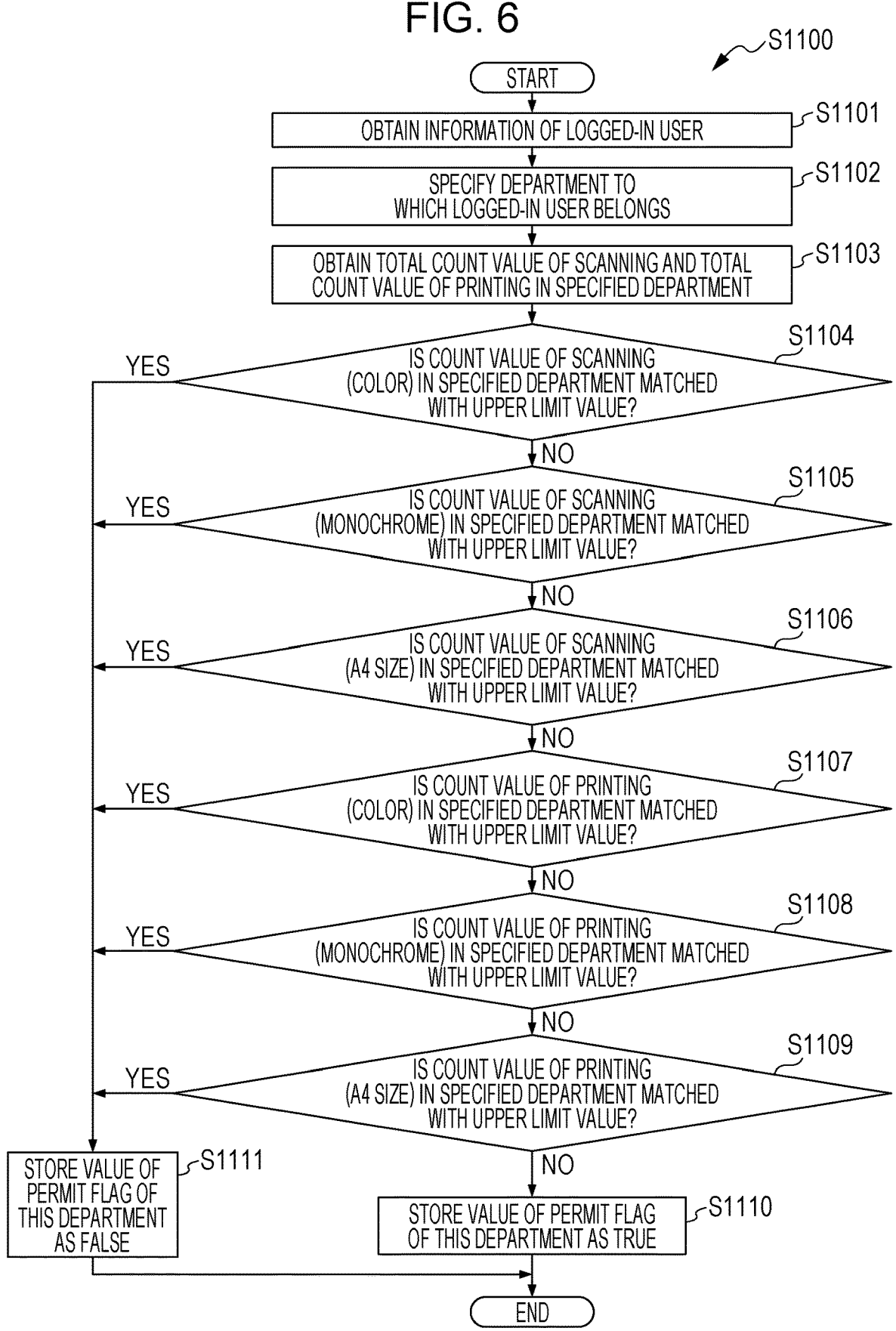

| USER ID | USER NAME | DEPARTMENT NAME |
|---|---|---|
| 10001 | aaaa | DEPARTMENT B |
| 10002 | bbbb | DEPARTMENT A |
| 10003 | cccc | DEPARTMENT A |
| 10004 | dddd | DEPARTMENT C |
| 10005 | eeee | DEPARTMENT A |
| ... | ... | ... |

| | COUNT VALUE | UPPER LIMIT VALUE |
|---|---|---|
| TOTAL SCANNING NUMBER | 1555 | 1800 |
| SCANNING (COLOR) | 555 | 800 |
| SCANNING (MONOCHROME) | 1000 | 1000 |
| SCANNING (A4 SIZE) | 753 | 1000 |
| SCANNING (B4 SIZE) | 439 | 500 |
| SCANNING (A3 SIZE) | 363 | 500 |
| ... | ... | ... |
| TOTAL PRINTING NUMBER | 1249 | 1800 |
| PRINTING (COLOR) | 378 | 800 |
| PRINTING (MONOCHROME) | 871 | 1000 |
| PRINTING (A4 SIZE) | 688 | 1000 |
| PRINTING (B4 SIZE) | 408 | 500 |
| PRINTING (A3 SIZE) | 53 | 500 |
| ... | ... | ... |

| NUMBER OF PIXELS IN MAIN SCANNING DIRECTION (pixel) |
| --- |
| NUMBER OF LINES IN SUB SCANNING DIRECTION (line) |

| COLOR MODE |
| --- |
| SCALING FACTOR (%) IN X DIRECTION |
| SCALING FACTOR (%) IN Y DIRECTION |
| READING RESOLUTION (pixel/inch) |
| OUTPUT RESOLUTION (pixel/inch) |
| ROTATION ANGLE (degrees) |
| OTHER FUNCTION SETTINGS |

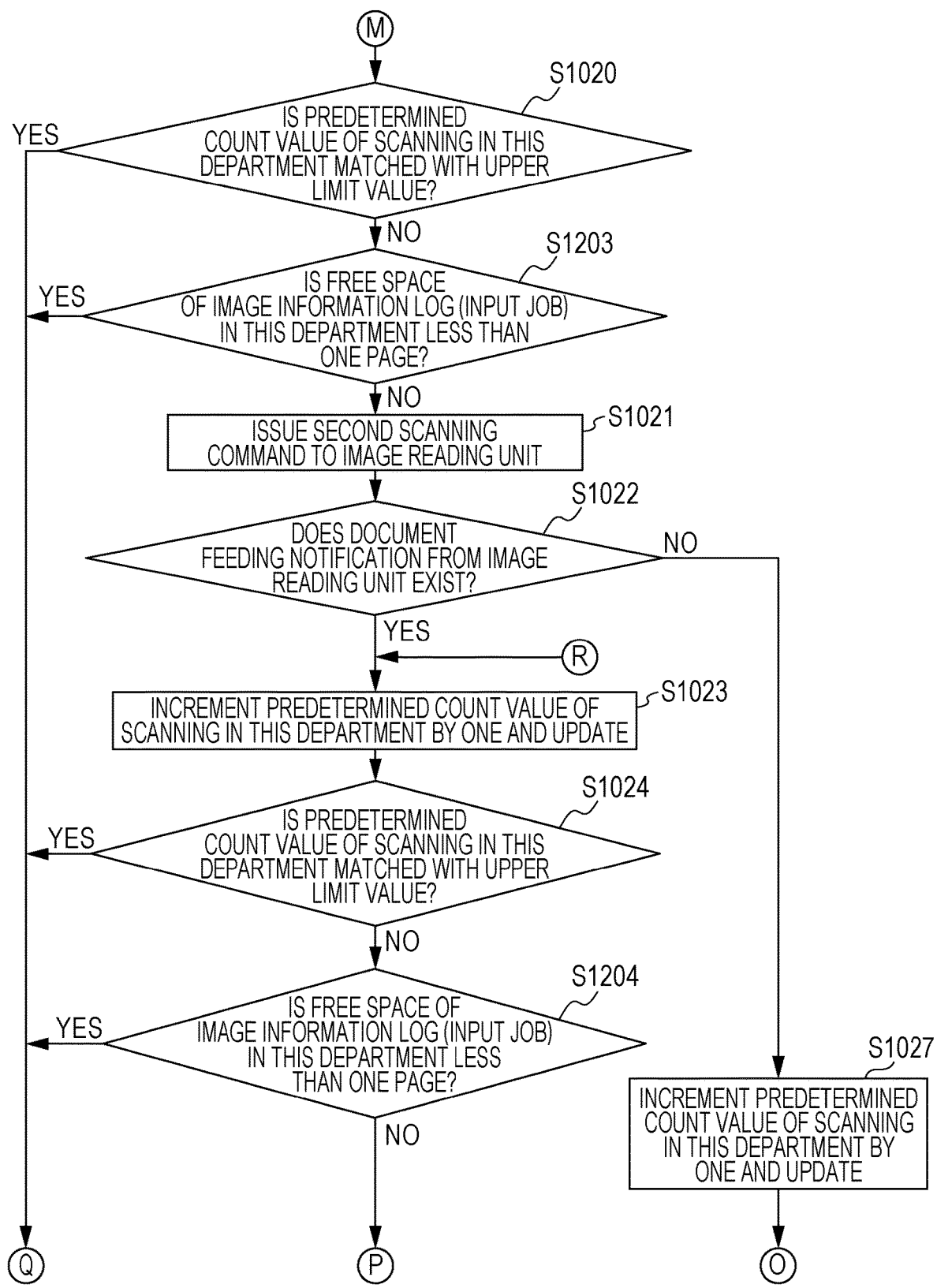

PRINTING APPARATUS, CONTROL METHOD FOR THE PRINTING APPARATUS, AND STORAGE MEDIUM FOR CONTROLLING A COPY PROCESS

CROSS-REFERENCE TO RELATED APPLICATIONS

This application is a Continuation of U.S. patent application Ser. No. 16/423,807, filed May 28, 2019, which is a Continuation of U.S. patent application Ser. No. 15/061,763, filed Mar. 4, 2016, now U.S. Pat. No. 10,331,387, which claims the benefit of Japanese Patent Application No. 2015-049973, filed Mar. 12, 2015, all of which are hereby incorporated by reference herein in their entirety.

BACKGROUND OF THE INVENTION

Field of the Invention

The present disclosure relates to a printing apparatus, a control method for the printing apparatus, and a storage medium.

Description of the Related Art

Up to now, a technology has been proposed in which a control apparatus analyzes a copy job where an execution instruction is accepted, and a sheet feeding reservation is thereafter issued to a printer apparatus in accordance with the number of pages of a document read by a reader apparatus and a set value set by an operation unit. For example, in a case where printing is performed on the basis of one-sided printing and also 2-in-1 (reduced layout), when generation of image data for two pages is ended, the control apparatus issues a sheet feeding reservation to the printer apparatus. Subsequently, the printer apparatus feeds a sheet from a specific sheet holding unit in response to the reception of the sheet feeding reservation (see Japanese Patent Laid-Open No. 2012-27236).

Up to now, since the sheet is fed from the sheet holding unit after a storage area for storing the image data generated by reading the image of the document, a delay for starting the feeding of the sheet from the sheet holding unit occurs. For this reason, it takes time to output a printed product.

SUMMARY OF THE INVENTION

According to an aspect of the present disclosure, there is provided a printing apparatus including: a feeding unit configured to feed a sheet from a sheet holding unit; a reading unit configured to read an image of a document; a storing unit configured to store image data of the document read by the reading unit; and a printing unit configured to read out, before image data for one page of the document is stored in the storing unit, the image data of the document from the storing unit and print the image on the sheet fed from the sheet holding unit by the feeding unit based on the read image data, in which the feeding unit is able to start to feed the sheet from the sheet holding unit before the image data for the one page of the document is stored in the storing unit.

Further features of the present invention will become apparent from the following description of exemplary embodiments with reference to the attached drawings.

BRIEF DESCRIPTION OF THE DRAWINGS

FIGS. 5A to 5D are flow charts for describing a control example according to the first exemplary embodiment.

FIG. 6 is a flow chart for describing the control example according to the first exemplary embodiment.

FIGS. 7A and 7B illustrate examples of a table according to the first exemplary embodiment.

FIG. 10 illustrates an example of a value set in a register of a scanner I/F according to the first exemplary embodiment.

FIG. 11 illustrates an example of a value set in a register of an image processing circuit according to the first exemplary embodiment.

FIGS. 12A to 12E are flow charts for describing a control example according to a second exemplary embodiment.

DESCRIPTION OF THE EMBODIMENTS

Hereinafter, exemplary embodiments of the present disclosure will be described in detail with reference to the accompanying drawings. It should be noted that the following exemplary embodiments are not designed to limit the present disclosure related to the scope of the claims, and not all of combinations of characteristics described in the exemplary embodiments of the present disclosure are necessarily indispensable to address the issues of the present disclosure.

First Exemplary Embodiment

A printing apparatus according to a first exemplary embodiment will be described with reference to FIG. 1 and FIG. 2.

Figure 1:
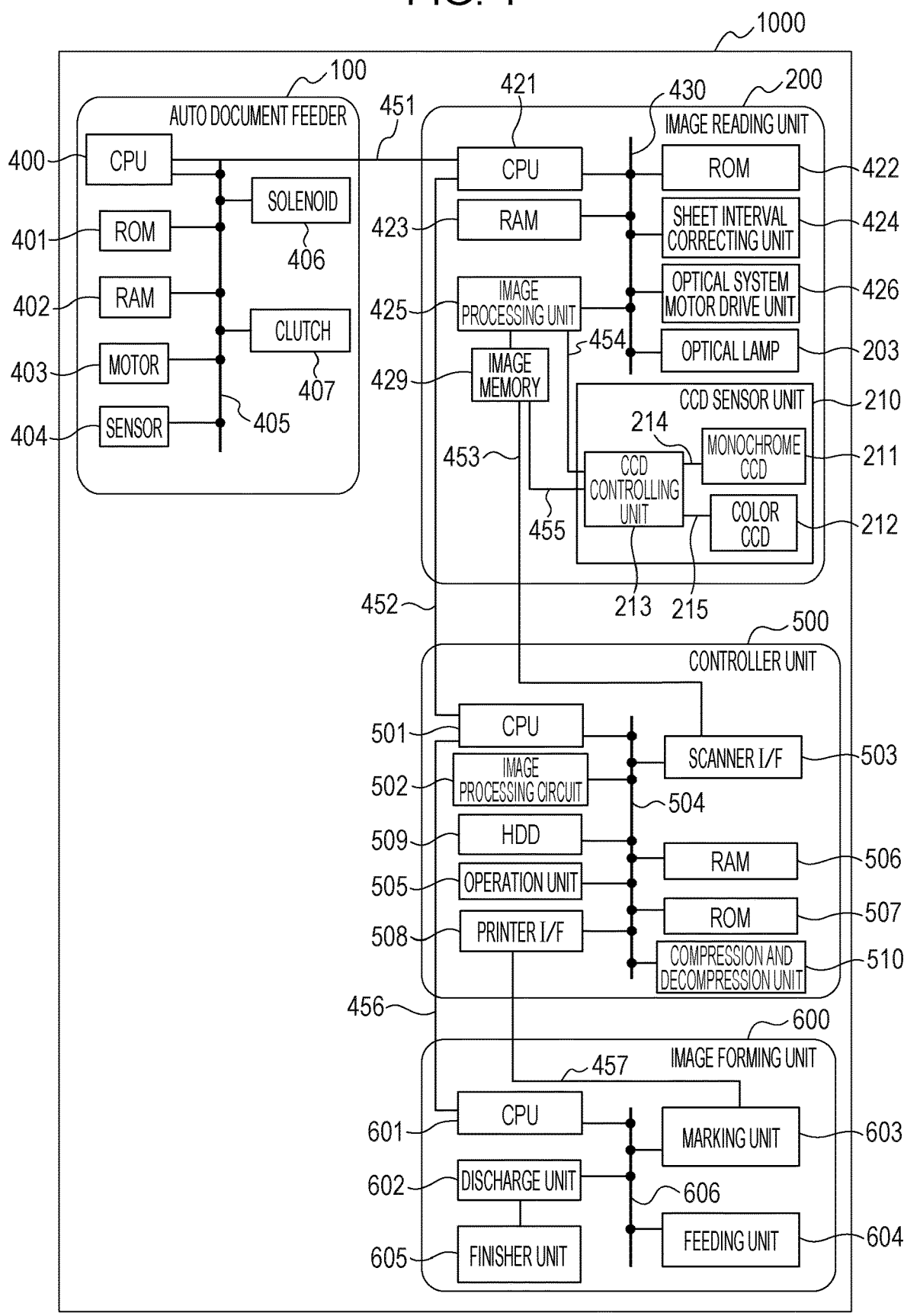
FIG. 1 is a block diagram illustrating a configuration of an MFP according to a first exemplary embodiment.

FIG. 1 is a block diagram illustrating a configuration of an MFP 1000 according to the present exemplary embodiment. FIG. 2 is a cross sectional view illustrating the configuration of the MFP 1000 according to the present exemplary embodiment.

According to the first exemplary embodiment, before a storage area for storing scanning image data is secured in a RAM 506, a controller unit 500 issues a command for starting to feed a sheet from a feeding unit 604. Subsequently, an image forming unit 600 starts to feed the sheet from the feeding unit 604 in response to the reception of this command. As a result, in a case where an image of a document is read, a time until the image is output to a sheet on the basis of image data generated by reading the document (which will be referred to as a first copy out time: FCOT) is shortened.

Hereinafter, details of the exemplary embodiments of the present disclosure will be described.

A printing apparatus according to the present exemplary embodiment is, for example, the MFP 1000 provided with an image reading function of reading an image of a document and generating image data and a printing function (copying function) of printing the image on a sheet on the basis of the generated image data. MFP stands for multi functional peripheral. It should be noted that the MFP 1000 may be provided with a printing function (PC printing function) of receiving a printing job from an external apparatus, such as a PC, and printing a character or an image on a sheet on the basis of this printing job.

As illustrated in FIG. 1, the MFP 1000 includes an auto document feeder (ADF) 100 which will be described below, an image reading unit 200, the controller unit (controlling unit) 500, and an image forming unit 600. These components are electrically connected to one another and mutually transmit and receive control commands and data.

Control Block of the ADF 100

The ADF 100 is provided with a CPU 400, a ROM 401, a RAM 402, an output port, and an input port as a plurality of function blocks. These components are electrically connected to one another via a bus line 405 and mutually transmit and receive the control commands and the data.

A motor 403 for driving various conveying rollers, a solenoid 406, and a clutch 407 are connected to the output port. Various sensors 404 such as a document detection sensor (not illustrated) configured to detect that a document 32 is set on a document tray 30 illustrated in FIG. 2 are all connected to the input port.

The ROM 401 is a read-only memory and stores a control program and a fixed parameter in advance. The RAM 402 is a memory where read and write can be performed and stores input data and working data.

The CPU 400 controls conveyance of the document 32 in accordance with the control program stored in the ROM 401. The CPU 400 also performs a serial communication with a CPU 421 of the image reading unit 200 via a control communication line 451 and transmits and receives control data with the ADF 100 and the image reading unit 200. The CPU 400 also transmits a signal representing a page start of the image data of the document 32 to the image reading unit 200 via the control communication line 451.

Control Block of the Image Reading Unit 200

The image reading unit 200 is provided with the CPU 421, a ROM 422, a RAM 423, a sheet interval correcting unit 424, an image processing unit 425, an optical system motor drive unit 426, an optical lamp 203, and a CCD sensor unit 210 as a plurality of function blocks. CCD stands for a charge coupled device. These components are electrically connected to one another via a control bus line 430 and mutually transmit and receive the control commands and the data. It should be noted that, in the CCD sensor unit 210, a monochrome image reading CCD 211 configured to read the image of the document in black and white is connected to a CCD controlling unit 213 via an image data communication line 214 including a clock signal line for the image transfer. In addition, in the CCD sensor unit 210, a color image reading CCD 212 configured to read the image of the document in color is connected to the CCD controlling unit 213 via an image data communication line 215 including the clock signal line for the image transfer.

The ROM 422 is a read-only memory and stores a program in advance. The RAM 423 is a memory where read and write can be performed and provides a work area including an area where nonvolatile storage is performed.

The sheet interval correcting unit 424 is a unit configured to control a conveyance interval of the documents 32 by the ADF 100 to correct an interval of the documents 32 conveyed by the ADF 100. The image processing unit 425 is a unit configured to perform various image processings such as shading correction on the image data generated by the reading of the image of the document.

The CPU 421 performs control on the conveyance of the document 32 by the ADF 100 and control on the reading of the image of the document 32 by the image reading unit 200. For example, the CPU 421 transmits a command related to the control of the conveyance of the document 32 via the control communication line 451 and instructs the CPU 400 to control the conveyance of the document 32. Subsequently, the CPU 400 that has been instructed to control the conveyance of the document 32 performs the control to monitor the various sensors 404 installed on a conveying path and drive the motor 403 for the conveyance, the solenoid 406, and the clutch 407 so as to convey the document 32.

For example, the CPU 421 also controls the optical system motor drive unit 426 corresponding to a driver circuit configured to drive an optical system driving monitor. In addition, for example, the CPU 421 controls the image processing unit 425 connected on the control bus line 430.

Furthermore, for example, the CPU 421 transmits a control signal to the CCD sensor unit 210 from a control communication line 454 via the image processing unit 425 to control the CCD sensor unit 210. Details of the exemplary embodiment will be described below. During a process of scanning the image of the document by the CCD sensor unit 210, an image signal is formed on the CCD sensor unit 210 (either the color image reading CCD 212 or the monochrome image reading CCD 211) by a lens 207. Subsequently, an analog image signal read for each line by the CCD sensor unit 210 is output to the CCD controlling unit 213 from the image data communication line 214 or the image data communication line 215. Subsequently, the CCD controlling unit 213 converts the analog image signal into digital image data. Subsequently, the image processing unit 425 performs various image processings on the converted image data, and thereafter, the CPU 421 writes the image data in an image memory 429 via an image data communication line 455 including the clock signal line for the image transfer.

The CPU 421 transmits the image data written in the image memory 429 to the controller unit 500 via an image data communication line 453 of a controller interface including the clock signal line for the image transfer. The CPU 421 also transmits a signal representing a page start of the image data of the document to the controller unit 500 via a control communication line 452 of the controller interface to adjust a transfer timing of the image data.

In addition, the CPU 421 similarly transmits a signal representing a page start of the image data notified from the ADF 100 via the control communication line 451 to the controller unit 500 via the control communication line 452.

Control Block of the Controller Unit 500

The controller unit 500 includes a plurality of function blocks. The controller unit 500 includes a CPU 501, an image processing circuit 502, a scanner I/F 503, an operation unit 505, the RAM 506, a ROM 507, a printer I/F 508, an HDD 509, and a compression and decompression unit 510 as the function blocks. These components are electrically connected to one another via a bus controller 504 and mutually transmit and receive the control commands and the data.

The CPU 501 controls processings, operations, and the like of the auto document feeder (ADF) 100, the image reading unit 200, the image forming unit 600, and various units (such as a feeding unit 604).

The RAM 506 is a memory where read and write can be performed and stores the image data transmitted from the image reading unit 200, various programs, setting information, and the like. It should be noted that the RAM 506 provides a work area also including an area where non-volatile storage is performed. It should be noted that the RAM 506 is, for example, a dynamic random access memory (DRAM).

The ROM 507 is a read-only memory and stores programs such as boot sequence and font information in advance.

The HDD 509 stores plural pieces of data such as system software, setting information of the job, print data of the job, image data converted into an RGB signal by the image processing circuit 502 which will be described below, and image data compressed by the compression and decompression unit 510 which will be described below. The HDD 509 also stores predetermined user information related to the user who logs in to the MFP 1000 (for example, a user ID, a user name, a password, and the like). The HDD 509 also stores an affiliation correspondence table 7000 which will be described below with reference to FIG. 7A and a department count table 7100 which will be described below with reference to FIG. 7B. The HDD 509 also stores a document file (image information log) for recording image data and page attribute associated with the input job and the output job executed by the MFP 1000. It should be noted that, according to the present exemplary embodiment, the HDD 509 will be described as an example of a large-capacity and non-volatile storage apparatus, but the configuration is not limited to this. A non-volatile memory such as a solid state drive (SSD) may be used.

The ROM 507 or the HDD 509 stores various control programs used for executing various processings of flow charts by the CPU 501 which will be described below. The ROM 507 or the HDD 509 also stores a display control program for causing a display unit of the operation unit 505, which will be described below, to display various user interface screens (will be referred to as user interface (UI) screens below). The CPU 501 reads out the program stored in the ROM 507 or the HDD 509 and executes various operations related to the present exemplary embodiment by decompressing this program in the RAM 506.

The scanner I/F 503 is an interface for connecting the controller unit 500 to the image reading unit 200. In the scanner I/F 503, the image data is cut out for the number of lines in accordance with a register value in the scanner I/F 503. It should be noted that examples of the register value in the scanner I/F 503 include a number of pixels in a main scanning direction (pixel) and a number of lines in a sub scanning direction (line) as indicated by a register 10000 of FIG. 10.

The printer I/F 508 is an interface for connecting the controller unit 500 to the image forming unit 600. The controller unit 500 performs control and conversion of synchronous system/asynchronous system of the image data through the scanner I/F 503 or the printer I/F 508.

The CPU 501 transmits the signal representing the page start of the image data which is received from the image reading unit 200 to the image forming unit 600 via the control communication line 456 of the controller interface to adjust the transfer timing. Subsequently, the CPU 501 transmits the image data written in the RAM 506 to the image forming unit 600 via the printer I/F 508 through an image data communication line 457 of the controller interface including the clock signal line for the image transfer.

The image processing circuit 502 executes image conversion processing on the image data stored in the RAM 506 in accordance with the register value in the image processing circuit 502 and thereafter stores the converted image data in the RAM 506 again. It should be noted that examples of the register value in the image processing circuit 502 include a color mode, a scaling factor (%) in the X direction, a scaling factor (%) in the Y direction, a reading resolution (pixel/inch), an output resolution, a rotation angle (degrees), and other function settings as indicated by a register 11000 of FIG. 11.

The image conversion processings performed by the image processing circuit 502 include rotation processing for rotating an image in units of 32 pixels×32 pixels at a specified angle, resolution conversion processing for converting the resolution of the image, scaling processing for setting the scaling factors of the image, matrix arithmetic processing for the multi-valued input image, and color space conversion processing. The color space conversion processing refers to processing of converting a YUV image into an Lab image by a look up table (LUT), and background removal and strike-through averting in related art can be carried out by this color space conversion.

The compression and decompression unit 510 includes an image processing block configured to perform processing of compressing and decompressing the image data or the like stored in the RAM 506 or the HDD 509 by way of various compression methods such as JBIG and JPEG and storing the image data in the RAM 506 or the HDD 509 again.

Figure 4:
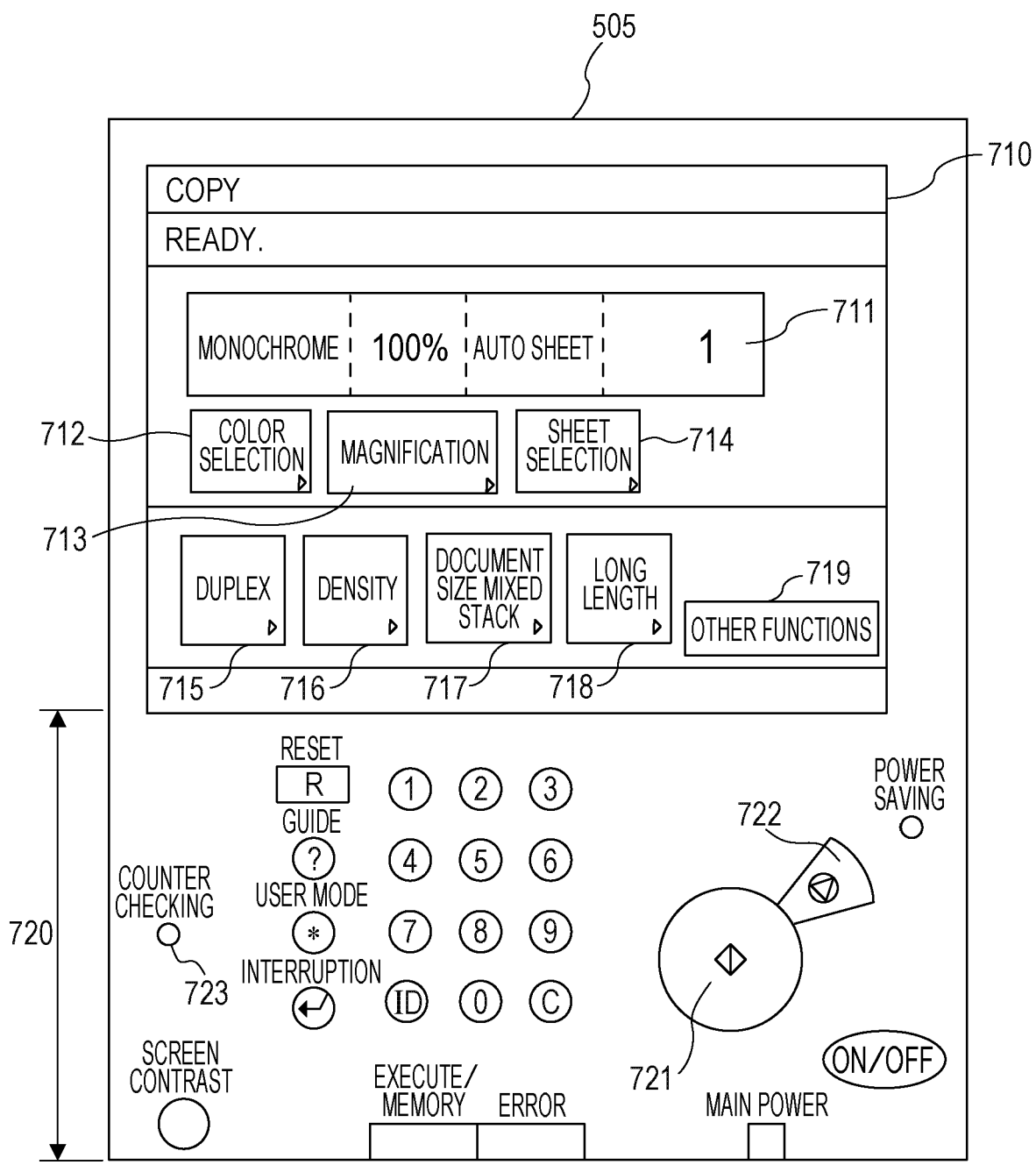
FIG. 4 is a top view of an operation unit of the MFP according to the first exemplary embodiment.

The operation unit 505 is relevant to an example of a user interface unit. FIG. 4 is a top view of the operation unit 505. As illustrated in FIG. 4, the operation unit 505 includes a display unit 710 and a key input unit 720. In addition, the operation unit 505 has a function of accepting various settings from a user via the display unit 710 or the key input unit 720. The operation unit 505 also has a function of providing information to the user via the display unit 710.

It should be noted that the display unit 710 is constituted as a touch panel sheet including a liquid crystal display (LCD) and transparent electrodes affixed on the LCD (which may be of a capacitance method). Buttons for setting a number of copies 711, color selection 712, magnification 713, and sheet selection 714 are arranged in the LCD as examples of basic settings for copying. As settings other than the basic settings for copying, for example, the user can set page printing, page layout, binding, and the like by pressing a button for setting other functions 719. It should be noted that a shortcut button can be created on a copy screen for a function frequently used by the user among the settings other than the basic settings for copying. For example, buttons for duplex 715 for setting duplex printing, density 716 for setting the printing density, document size mixed stack 717 for reading the documents having different sizes, long length 718 for reading the document having a length longer lengthwise or crosswise than a formatted size, and the like are arranged. It should be noted that various pieces of setting information for copying which are input by the user from an operation screen or the like of the LCD are stored in the HDD 509. The operation screen for these buttons and a state of the MFP 1000 are displayed on the LCD.

The key input unit 720 is constituted by a plurality of hard keys. The hard keys include, for example, a start key 721 for instructing execution of the job, a stop key 722 for instructing abort of the currently executed job, a counter checking key 723 for displaying a total number of sheets on which the printing has been performed so far (number of output sheets) on the LCD, and the like.

A signal input by the touch panel or the hard key is transmitted to the CPU 400.

Control Block of the Image Forming Unit 600

The image forming unit 600 includes a CPU 601, a discharge unit 602, a marking unit 603, the feeding unit 604, and a finisher unit 605 as a plurality of function blocks.

These components are electrically connected to one another via a bus controller 606 and mutually transmit and receive the control commands and the data.

The feeding unit 604 is constituted by a plurality of cassettes for holding sheets 301 used for printing and a manual feeding tray. The marking unit 603 is a unit configured to perform transferring and fixing of a toner (developing agent) image formed on the basis of the image data on the sheet 301 fed from the feeding unit 604 and form (print) the image on the sheet 301 by using the toner. It should be noted that details of the transferring and the fixing will be described below with reference to FIG. 2. The discharge unit 602 is a unit configured to discharge the sheet 301 on which the image has been formed to an area outside the machine. The finisher unit 605 is a unit configured to perform post processings such as shifting processing, stapling processing, punching processing, and sorting processing.

The CPU 601 controls the image forming unit 600. For example, in a case where the marking unit 603 completes preparations for the image formation, the CPU 601 transmits a signal representing page start of the image data (such as start of the first page or start of the second page) to the controller unit 500 via a control communication line 456 of the controller interface. This operation is performed to adjust a transfer timing. Subsequently, the marking unit 603 performs the transferring and the fixing of the toner image on the basis of the image data transmitted via the image data communication line 457 of the controller interface.

Configuration Example of the ADF 100

An operation of the ADF 100 will be described with reference to FIG. 2. The ADF 100 includes the document tray 30 on which a sheaf (stack) of documents constituted by one or more of the documents 32 are set, a separation pad 21 that regulates exiting toward downstream while the sheaf of the documents protrudes from the document tray 30 before the start of the conveyance of the document 32, and a feeding roller 1.

The feeding roller 1 drops onto a document surface of the sheaf of the documents set on the document tray 30 and rotates. As a result, the document 32 on the uppermost surface of the sheaf of the documents is fed. The plurality of documents 32 fed by the feeding roller 1 are separated into one sheet each to be fed by actions of a separation roller 2 and the separation pad 21. This separation is realized by a retard separation technique in related art.

The document 32 separated by the separation roller 2 and the separation pad 21 is conveyed to a registration roller 4 by a conveying roller pair 3. Subsequently, the conveyed document 32 abuts against the registration roller 4. As a result, the document 32 is formed into a loop shape, and skew in the conveyance of the document 32 is cancelled. A feeding path is arranged in the downstream side of the registration roller 4. The document 32 that has passed through the registration roller 4 is conveyed through the feeding path in a direction of a stream reading glass 201.

The document 32 conveyed through the feeding path is conveyed onto a platen by a large roller 7 and a feeding roller 5. Herein, the large roller 7 comes in contact with the stream reading glass 201. The document 32 conveyed by the large roller 7 passes through a conveying roller 6 and moves between a roller 16 and a movement glass. Subsequently, the document 32 is discharged to a document discharge tray 31 via a discharge flapper and a discharge roller 8.

The ADF 100 can read an image on a rear surface of the document 32 by reversing the document 32. Specifically, the discharge roller 8 is reversed to switch the discharge flapper in a stage in which the document 32 is engaged with the discharge roller 8, and the document 32 is moved to a reversing path 19. The moved document 32 abuts against the registration roller 4 from the reversing path 19, and the document 32 is formed into a loop shape again, so that skew in the conveyance of the document 32 is cancelled. Thereafter, the document 32 is moved to the stream reading glass 201 again by the feeding roller 5 and the large roller 7, and the image on the rear surface of the document 32 can be read by the stream reading glass 201.

A guide regulating plate 15 that can slide in the sub scanning direction of the sheaf of the set documents is provided to the document tray 30, and a document width detection sensor (not illustrated) configured to detect a document width in conjunction with the guide regulating plate 15 is also provided. A size of the document 32 in the sheaf of the documents set on the document tray 30 can be determined by a combination of this document width detection sensor and a pre-registration sensor 11. In addition, a document length can be detected by a document length detection sensor (not illustrated) provided in the conveying path on the basis of a conveyance distance from leading end detection to rear end detection of the currently conveyed document 32. The size of the document can also be determined from a combination of the detected document length and the above-described document width detection sensor.

Configuration Example of the Image Reading Unit 200

Figure 2:
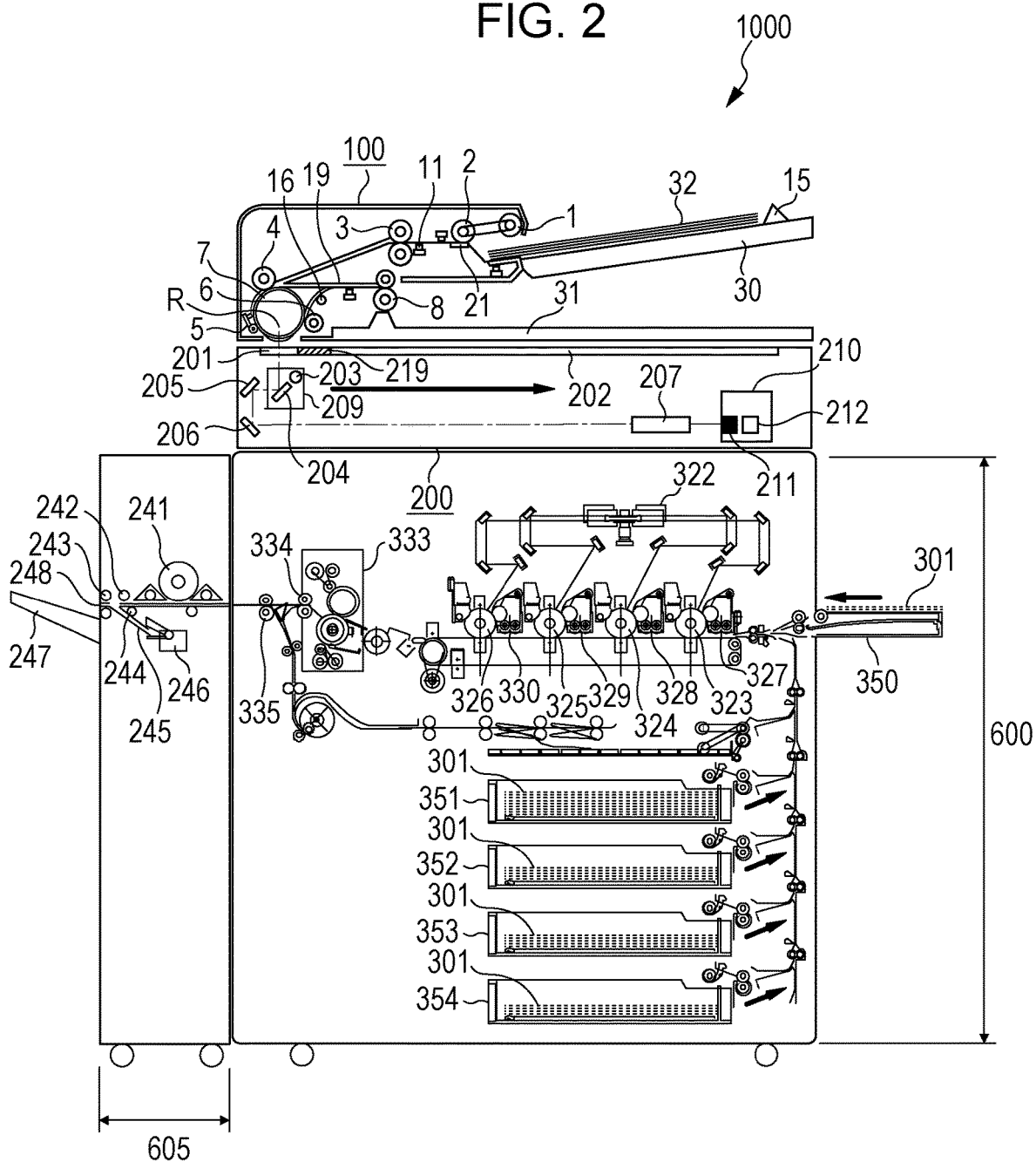
FIG. 2 is a cross sectional view illustrating the configuration of the MFP according to the first exemplary embodiment.

With regard to a document 32 on a platen glass 202, the image reading unit 200 optically reads image information recorded on the document while an optical scanner unit 209 performs scanning in the sub scanning direction indicated by an arrow of FIG. 2. With regard to the documents 32 on the ADF 100, each of the documents 32 on the document tray 30 is conveyed to a reading center position. Furthermore, the optical scanner unit 209 is moved to reach the reading center position of the large roller 7 of the ADF 100, and the document 32 is read by the reading center position of the large roller 7. The document 32 on the ADF 100 or the document on the platen glass 202 is read by the next optical system. This optical system is provided with the stream reading glass 201, the platen glass 202, the optical scanner unit 209 including the optical lamp 203 and a mirror 204, mirrors 205 and 206, the lens 207, and the CCD sensor unit 210. According to the present exemplary embodiment, the CCD sensor unit 210 is constituted by the color image reading (RGB) CCD (three-line sensor unit) 212 and the monochrome image reading CCD (one-line sensor unit) 211.

The image information read by this optical system is photoelectrically converted and input to the controller unit 500 as image data. It should be noted that a white board 219 is used for creating reference data of a white level based on shading.

It should be noted that, according to the present exemplary embodiment, the descriptions have been given of a case where the optical system provided to the image reading unit 200 is a reduction optical system in which reflected light from the document is imaged on the CCD sensor, but the configuration is not limited to this. The optical system provided to the image reading unit 200 may be an equal magnification optical system in which the reflected light from the document is imaged on a contact image sensor (CIS).

Subsequently, the arrangement of the sensors configured to detect the size of the document set on the platen glass 202 will be described with reference to a top view of the platen glass 202 illustrated in FIG. 3.

The optical scanner unit 209 is a unit configured to detect the size of the document 32 in the main scanning direction. Reflection-type sensors 220 and 221 are sensors configured to detect the size of the document 32 in the sub scanning direction.

When the ADF 100 is opened by the user to set the document 32 on the platen glass 202, the CPU 421 detects that the ADF 100 is opened. Subsequently, the CPU 421 causes the optical scanner unit 209 to move to a position where the set document 32 can be read.

Figure 3:
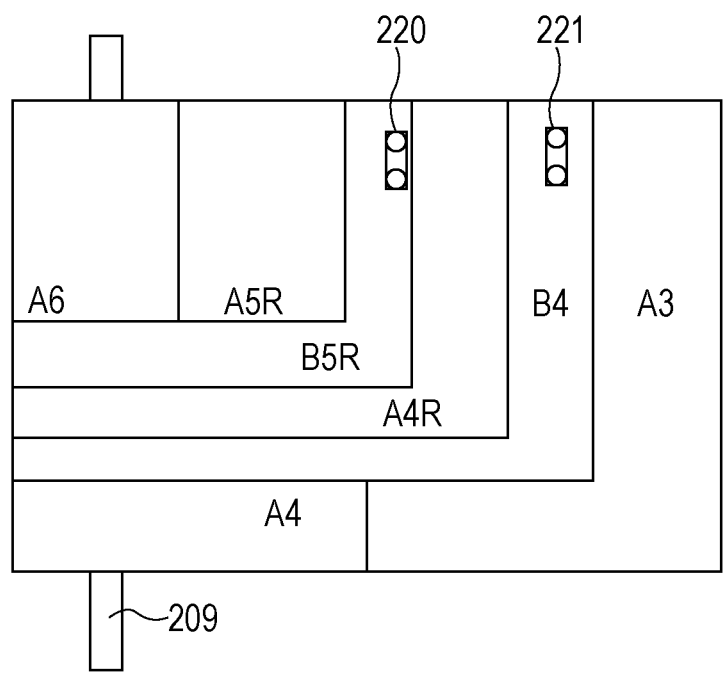
FIG. 3 is a top view of a platen glass of the MFP according to the first exemplary embodiment.

The size of the document 32 set on the platen glass 202 in the sub scanning direction is detected by the plurality of reflection-type sensors 220 and 221 arranged as illustrated in FIG. 3. The reflection-type sensors 220 and 221 emit infrared light from light emitting units from a bottom side of the platen glass 202 and receive reflected light from the document 32 by light receiving units to detect an approximate length in the sub scanning direction of the document 32.

Subsequently, when the user starts to perform an operation for closing the ADF 100, the optical lamp 203 is turned on to illuminate the document 32 while the ADF 100 is being closed. Subsequently, the monochrome image reading CCD 211 (or the color image reading CCD 212) reads a certain line of the document 32 in the main scanning direction. With regard to the light from the optical lamp 203, a part where the light is shielded and reflected by the document 32 and a part where the reflected light is not shielded and returned since the document 32 does not exist are detected, and end parts of the document 32 are detected on the basis of the detection results. Since the document size of the formatted size can be confirmed by the thus detected length in the main scanning direction and an approximate length in the sub scanning direction, the document size is confirmed.

A reason why the detection in the sub scanning direction is performed to such an extent that a length can be classified into an approximate length is that the length in the main scanning direction can be precisely detected to some extent. For example, in a case where the length in the main scanning direction for the A4 size can be detected as the length in the main scanning direction, when both the reflection-type sensors 220 and 221 in the sub scanning direction detect the reflected light from the document, this size can be confirmed as the A3 size. When both the reflection-type sensors 220 and 221 do not detect the reflected light, this size can be confirmed as the A4 size. According to the present exemplary embodiment, the case has been described where the size is confirmed by detecting the size of the read document 32 by the sensors 220 and 221, but the configuration is not limited to this. In the MFP 1000 that is not provided with a sensor configured to detect the size of the read document, the size may be confirmed while the user inputs the size of the read document 32 from the operation unit 505.

Configuration Example of the Image Forming Unit 600

Subsequently, an operation (printing operation) of outputting an image to the sheet 301 on the basis of the image data transmitted (transferred) to the image forming unit 600 will be described below.

The image data transmitted (transferred) to the image forming unit 600 is converted into laser light by a laser unit 322 in accordance with the image data. Subsequently, photosensitive drums 323 to 326 are irradiated with this laser light, and electrostatic-latent images in accordance with the image data are formed on the photosensitive drums 323 to 326. Toner (developing agent) is adhered to parts corresponding to the latent images of the photosensitive drums 323 to 326 by developing units 327 to 330. It should be noted that a color printer is provided with four each of photosensitive drums 323 to 326 and developing units 327 to 330 for cyan, yellow, magenta, and black.

The image forming unit 600 is also provided with the feeding unit 604, and the feeding unit 604 includes cassettes 351 to 354 and a manual feeding tray 350 as a sheet holding unit (also referred to as a sheet feeding deck). It should be noted that the cassettes 351 to 354 have a slide-out shape and can hold the plurality of sheets 301 (for example, 600 sheets). On the other hand, the manual feeding tray 350 has a plug-in shape and can hold the plurality of sheets sheet 301 (for example, 100 sheets).

The image forming unit 600 feeds the sheet 301 from any one of the cassettes 351 to 354 and the manual feeding tray 350. Subsequently, with respect to the fed sheet 301, the toner adhered to the photosensitive drums 323 to 326 is transferred to the sheet 301, and thereafter, the sheet 301 is conveyed to a fixing unit 333. Subsequently, the toner is fixed onto the sheet 301 by heat and pressure. The sheet 301 that has passed through the fixing unit 333 is conveyed to the finisher unit 605 by conveying rollers 334 and 335.

The sheet conveyed to the finisher unit 605 is first conveyed to a buffer unit 241 of the finisher unit 605. Herein, the conveyed sheet is wound around a buffer roller to perform buffering in accordance with the case. For example, in a case where the stapling processing or the like to be performed in the downstream thereof takes time, it is possible to adjust a conveyance interval of the sheets conveyed from the main body by using the buffer unit 241. Thereafter, the sheet passes through a conveying path 244 by an upstream discharging roller pair 242 and a downstream discharging roller pair 243 to be stacked on a stack tray 245. When the sheaf of sheets for one set of copies are stacked on the stack tray 245, the sheaf of stacked sheets pass through a conveying path 248 and are discharged to a discharging tray 247 functioning as a discharge unit.

In a case where the shifting is specified, the sheaf of sheets stacked on the stack tray 245 are discharged to the discharging tray 247 functioning as the discharge unit while being shifted with respect to the sheaf of sheets discharged immediately before, so that it becomes easier for the user to find a break between the copies. On the other hand, in a case where the stapling is specified, a stapling unit 246 performs stapling processing on the sheaf of sheets that are conveyed by the upstream discharging roller pair 242 and pass via the conveying path 244 by the downstream discharging roller pair 243 to be stacked on the stack tray 245. The sheaf of stapled sheets are discharged to the discharging tray 247 by the downstream discharging roller pair 243.

It should be noted that, in the MFP 1000 that is not provided with the finisher unit 605, the sheet that has passed through the fixing unit 333 may be directly discharged to the discharging tray 247 by the conveying rollers 334 and 335. In addition, in the MFP 1000 that is not provided with the discharging tray 247 functioning as the discharge unit, the sheet that has passed through the fixing unit 333 may be discharged into a barrel functioning as the discharge unit.

It should be noted that the descriptions have been given of a case where the MFP 1000 according to the present exemplary embodiment is the color printer provided with four each of the photosensitive drums 323 to 326 and the developing units 327 to 330, but the configuration is not limited to this. The subject aspect of the present disclosure can be similarly applied to the MFP 1000 even when the MFP 1000 is a monochrome printer provided with one each of the photosensitive drum and the developing unit. In addition, the method of printing the image on the sheet 301 by way of an electrophotographic method in the MFP 1000 according to the present exemplary embodiment has been described, but the configuration is not limited to this. As long as the image can be printed on the sheet 301, for example, an ink-jet method or the like may be adopted, and the other method (for example, a thermal-transfer method or the like) may also be adopted.

According to the first exemplary embodiment, the controller unit 500 issues the command for starting to feed the sheet from the feeding unit 604 before the storage area for storing the scanning image data is secured in the RAM 506. Subsequently, the image forming unit 600 starts to feed the sheet from the feeding unit 604 in response to the reception of this command. As a result, for example, in a case where the image of the document is read, the time (FCOT) until the image is output to the sheet on the basis of the image data generated by reading the document is shortened.

Details of the above-described configuration will be described below.

With reference to flow charts illustrated in FIGS. 5A to 5D, details of a series of processings will be described in which an execution instruction of a copy job is accepted in the MFP 1000 according to the first exemplary embodiment, and the copy job where the execution instruction is accepted is executed. This processing is executed while the CPU 501 of the controller unit 500 executes the control program read out from the ROM 507 or the HDD 509 and decompressed to the RAM 506. It should be noted that this processing is started in a state, for example, in which an authentication screen (not illustrated) for logging in to the MFP 1000 is displayed on the display unit 710.

In S1001, the CPU 501 determines whether or not the user has logged in to the MFP 1000. It should be noted that, after the user inputs, for example, the predetermined user information (for example, the user ID, the user name, the password, and the like) to the authentication screen (not illustrated), the user logs in to the MFP 1000 by pressing a login button (not illustrated) on the authentication screen (not illustrated). When it is determined that the user has logged in to the MFP 1000, the CPU 501 advances the processing to S1100 which will be described below with reference to FIG. 11. On the other hand, the CPU 501 repeats the processing in S1001 until it is determined that the user has logged in to the MFP 1000. It should be noted that, when it is determined that a logout button (not illustrated) is pressed, the CPU 501 may end the series of processings related to FIGS. 5A to 5D.

It should be noted that, with regard to the login to the MFP 1000, a method of causing the CPU 501 to obtain user information may be employed by reading the user information from a card owned by the user with use of a card reading unit (not illustrated). It should be noted that all of a user ID, a user name, and a password are not necessarily needed for the user information, and only the user ID and the user name may constitute the user information.

Details of the series of processing for checking count values (the number of times to perform scanning and the number of times to perform printing) in the department to which the logged-in user belongs in the MFP 1000 according to the first exemplary embodiment will be described with reference to a flow chart illustrated in FIG. 6. This processing is executed while the CPU 501 of the controller unit 500 executes the control program read out from the ROM 507 or the HDD 509 and decompressed to the RAM 506.

Figure 5A:
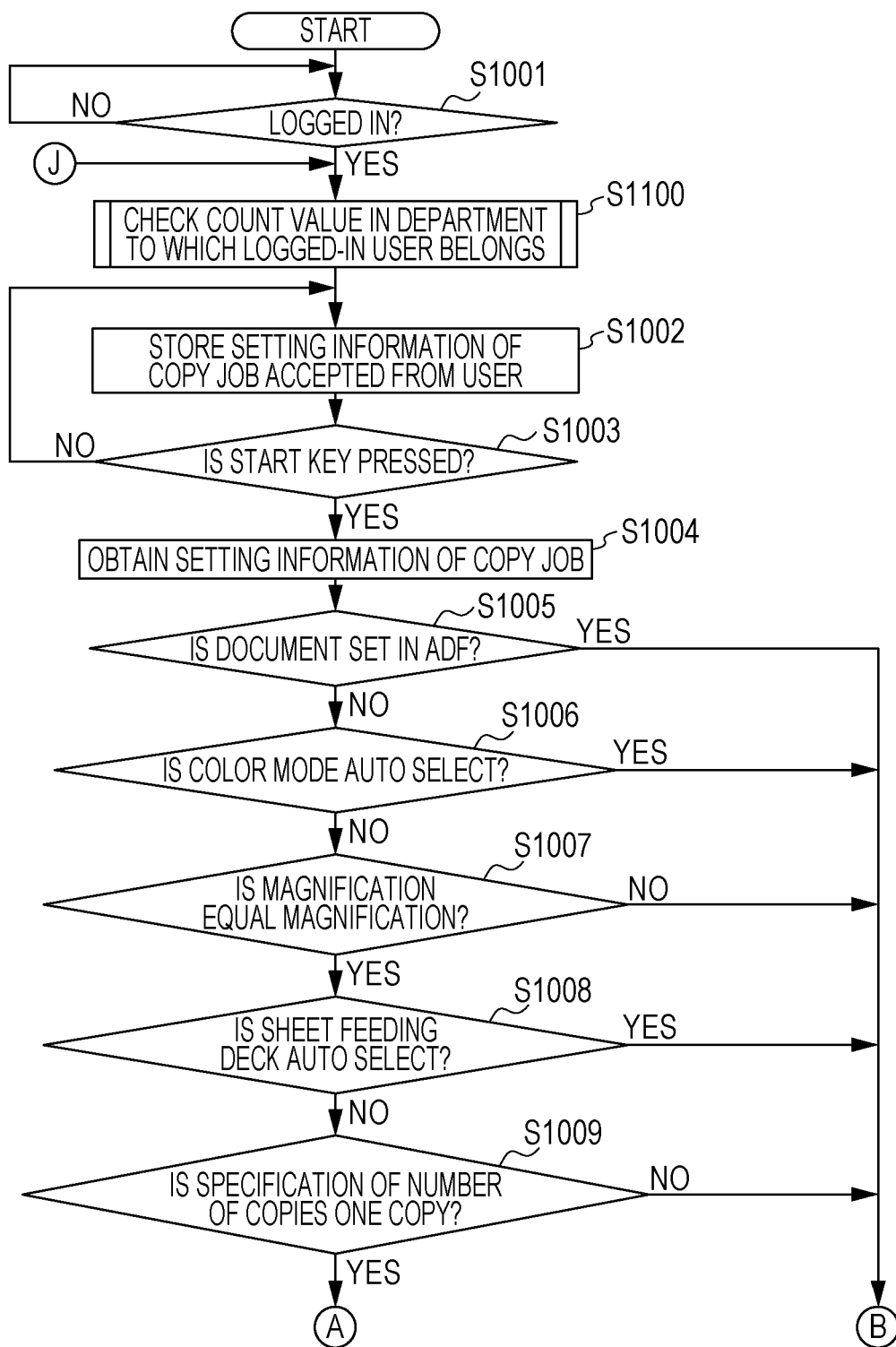
Figure 5C:
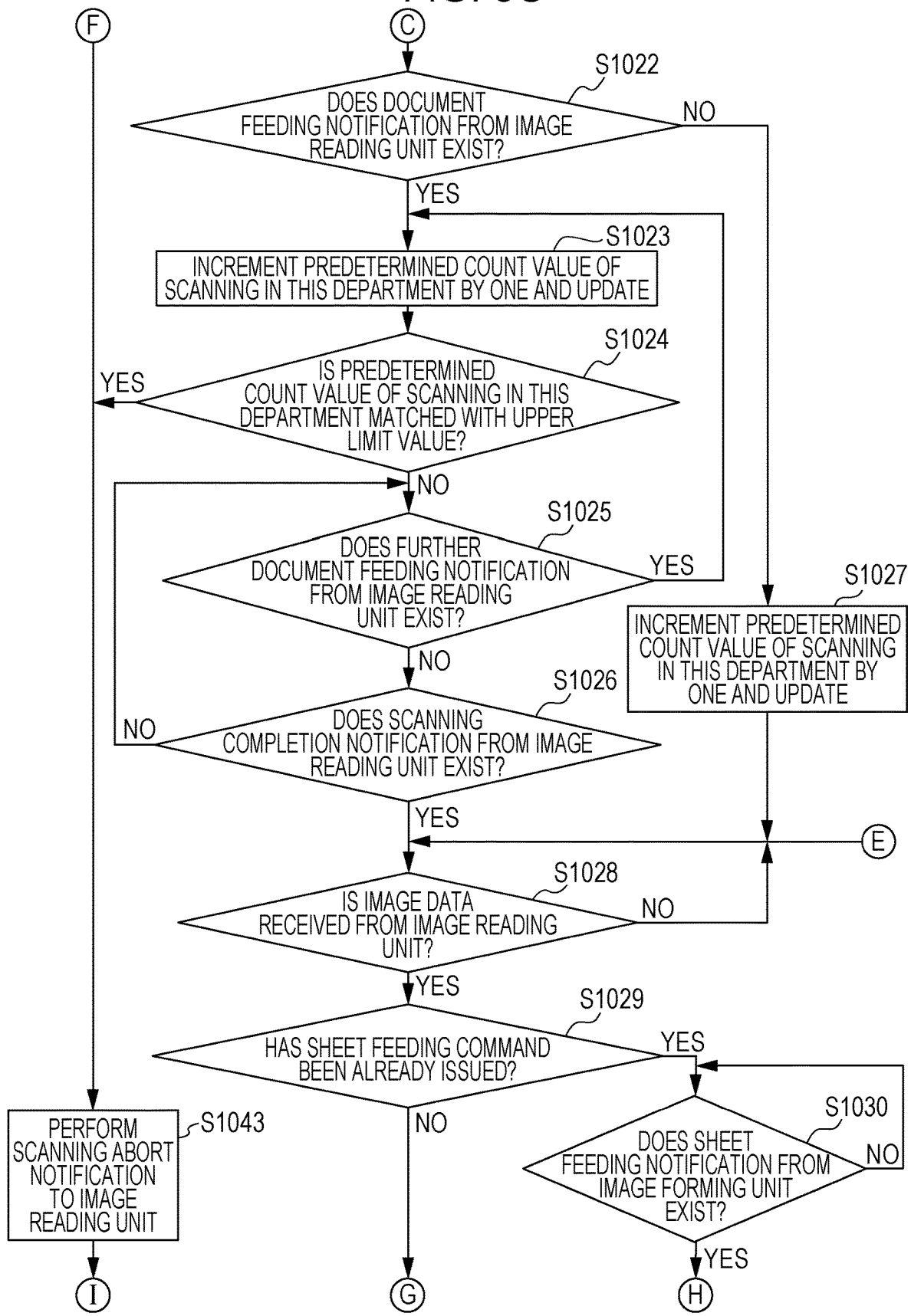

In S1101, the CPU 501 obtains the information (for example, the user ID, the user name, the password, and the like) of the logged-in user in S1001 in FIG. 5A from the HDD 509 and advances the processing to S1102.

In S1102, the CPU 501 refers to the affiliation correspondence table 7000 illustrated in FIG. 7A which is stored in the HDD 509 to specify the department to which the logged-in user belongs on the basis of the information of the user obtained in S1101 and advances the processing to S1103. In the example of FIG. 7A, in a case where the user ID of the logged-in user is "10002", the CPU 501 specifies that the department to which the logged-in user belongs is a "department A".

In S1103, the CPU 501 refers to the department count table 7100 illustrated in FIG. 7B which is stored in the HDD 509 to obtain a total count value of the scanning and a total count value of the printing in the department specified in S1102 and advances the processing to S1104. It should be noted that the department count table 7100 is a table for counting the number of scanned documents for each scanning setting. The department count table 7100 is a table for counting the number of printed sheets for each printing setting. The department count table 7100 described above is managed for each department.

In S1104, the CPU 501 determines whether or not the count value of the scanning (color) in the department specified in S1102 is matched with an upper limit value. For example, in a case where the count value of the scanning (color) in the department A is "800" and also the upper limit value is "800", the CPU 501 determines that the count value of the scanning (color) is matched with the upper limit value. For example, in a case where the count value of the scanning (color) in the department A is "555" and also the upper limit value is "800", the CPU 501 determines that the count value of the scanning (color) is not matched with the upper limit value. When it is determined that the values are matched to each other (that is, YES), the CPU 501 advances the processing to S1111. On the other hand, in a case where it is determined as NO, the CPU 501 advances the processing to S1105.

In S1105, the CPU 501 determines whether or not the count value of the scanning (monochrome) in the department specified in S1102 is matched with an upper limit value. When it is determined that the values are matched to each other (that is, YES), the CPU 501 advances the processing to S1111. On the other hand, in a case where it is determined as NO, the CPU 501 advances the processing to S1106.

In S1106, the CPU 501 determines whether or not the count value of the scanning (A4 size) in the department specified in S1102 is matched with an upper limit value. When it is determined that the values are matched to each other (that is, YES), the CPU 501 advances the processing to S1111. On the other hand, in a case where it is determined as NO, the CPU 501 advances the processing to S1107.

In S1107, the CPU 501 determines whether or not the count value of the printing (color) in the department specified in S1102 is matched with an upper limit value. When it is determined that the values are matched to each other (that is, YES), the CPU 501 advances the processing to S1111. On the other hand, in a case where it is determined as NO, the CPU 501 advances the processing to S1108.

In S1108, the CPU 501 determines whether or not the count value of the printing (monochrome) in the department specified in S1102 is matched with an upper limit value. When it is determined that the values are matched to each other (that is, YES), the CPU 501 advances the processing to S1111. On the other hand, in a case where it is determined as NO, the CPU 501 advances the processing to S1109.

In S1109, the CPU 501 determines whether or not the count value of the printing (A4 size) in the department specified in S1102 is matched with an upper limit value. When it is determined that the values are matched to each other (that is, YES), the CPU 501 advances the processing to S1111. On the other hand, in a case where it is determined as NO, the CPU 501 advances the processing to S1110.

In S1110, the CPU 501 stores a value of a permit flag of the department specified in S1102 as "TRUE" in the HDD 509. After the processing in S1110, the processing is advanced to S1002 of FIG. 5A.

In S1111, the CPU 501 stores the value of the permit flag of the department specified in S1102 as "FALSE" in the HDD 509. After the processing in S1111, the processing is advanced to S1002 of FIG. 5A.

It should be noted that, with regard to the flow charts of FIGS. 5A to 5D, the case where the CPU 501 performs all of the determination processings in S1104 to S1109 has been described, but the configuration is not limited to this. For example, in a case where the MFP 1000 is a monochrome machine, since color printing is not performed, the CPU 501 may skip the determination processing in S1107. In addition, for example, in a case where the image reading unit 200 provided to the MFP 1000 does not correspond to color scanning, the color scanning is not performed, the CPU 501 may skip the determination processing in S1104. For example, in S1106 and S1109, the case where the CPU 501 performs the determination by using the A4 size as a reference has been described, but the determination may be performed by using a size other than the A4 size (for example, the B4 size or the A3 size) as the reference.

It should be noted that, in FIG. 7B described above, the case where the count table (710) in units of department is stored in the HDD 509 has been described, but the configuration is not limited to this. A count table in units of user may be stored in the HDD 509. In this case, the CPU 501 may perform the processings in S1104 to S1109 described above on the user count table in units of user.

Here, descriptions will be given of the flow charts of FIGS. 5A to 5D (processings in S1002 and subsequent steps) again.

In S1002, the CPU 501 stores the setting information of the copy job accepted from the user via the display unit 710 in the HDD 509 and advances the processing to S1003. It should be noted that the setting information of the copy job accepted from the user via the display unit 710 includes the settings such as, for example, the number of copies 711, the color selection 712, the magnification 713, the sheet selection 714, the page printing, the page aggregation, and the binding.

In S1003, the CPU 501 determines whether or not the user presses the start key 721 in a state in which the copy screen illustrated in FIG. 4 is displayed on the display unit 710. When it is determined that the user presses the start key 721 (that is, YES), the CPU 501 advances the processing to S1004. On the other hand, in a case where it is determined as NO, the CPU 501 returns the processing to S1002.

In S1004, the CPU 501 obtains various pieces of setting information for the copy job by referring to the setting information of the copy job stored in the HDD 509 and advances the processing to S1005.

In S1005, the CPU 501 determines whether or not the document is set in the ADF. It should be noted that a state in which the document is set in the ADF can be determined on the basis of the detection by the document detection sensor (not illustrated). When it is determined that the document is set (that is, YES), the CPU 501 advances the processing to S1014. On the other hand, in a case where it is determined as NO, the CPU 501 advances the processing to S1006.

In S1006, the CPU 501 determines whether or not the color mode is "auto select" from the setting information of the copy job obtained in S1004. It should be noted that the color mode is arbitrarily specified by the user by using the color selection 712. A state in which the color mode is "auto select" means that the image data generated by reading the image of the document is analyzed by the CPU 501 to determine whether the read document is color or monochrome. On the other hand, in a case where the user previously specifies whether the read document is "color" or "monochrome" by using the color selection 712, the color mode is not auto select. In a case where it is determined as auto select (that is, YES), the CPU 501 advances the processing to S1014. On the other hand, in a case where it is determined as NO, the CPU 501 advances the processing to S1007.

In S1007, the CPU 501 determines whether or not the magnification is "equal magnification" on the basis of the setting information of the copy job obtained in S1004. It should be noted that the magnification is arbitrarily specified by the user by using the magnification 713. A state in which the magnification is "equal magnification" refers to a case where the user specifies that the magnification is "100%", for example, or a case where the output sheet size is specified as A4 while the document size is A4. On the other hand, a state in which the magnification is not "equal magnification" (that is, "variable magnification") refers to a case where the user specifies that the magnification is "86%", for example, or a case where the output sheet size is specified as A3 while the document size is B4. In a case where it is determined as the equal magnification (that is, YES), the CPU 501 advances the processing to S1008. On the other hand, in a case where it is determined as NO, the CPU 501 advances the processing to S1014.

In S1008, the CPU 501 determines whether or not the sheet feeding deck is "auto select" on the basis of the setting information of the copy job obtained in S1004. It should be noted that the setting of the sheet feeding deck is arbitrarily selected by the user by using the sheet selection 714. A state in which the sheet feeding deck is "auto select" means that a search is performed for one of the cassettes 351 to 354 that holds the sheet having the size matched with the output sheet size, and the sheet is fed from the cassette that holds the sheet having the size matched with the output sheet size. It should be noted that the output sheet size is determined, for example, on the basis of the size of the read document detected by the reflection-type sensors 220 and 221 and the magnification 713. On the other hand, a state in which the sheet feeding deck is not "auto select" refers to a case where, for example, one of the cassettes 351 to 354 and the manual feeding tray 350 for feeding the sheet to be output is previously specified by the user by using the sheet selection 714. In a case where it is determined as auto select (that is, YES), the CPU 501 advances the processing to S1014. On the other hand, in a case where it is determined as NO, the CPU 501 advances the processing to S1009.

In S1009, the CPU 501 determines whether or not the specification of the number of copies 711 is "one copy" on the basis of the setting information of the copy job obtained in S1004. In a case where it is determined as one copy (that is, YES), the CPU 501 advances the processing to S1010. On the other hand, in a case where it is determined as NO, the CPU 501 advances the processing to S1014.

In S1010, the CPU 501 refers to the value of the permit flag stored in the HDD 509 to obtain the value of the permit flag of the department to which the logged-in user in S1001 belongs (hereinafter, will be referred to as this department) and advances the processing to S1011.

In S1011, the CPU 501 determines whether or not the value of the permit flag of this department obtained in S1010 is "TRUE". In a case where it is determined as "true" (that is, YES), the CPU 501 advances the processing to S1012. On the other hand, in a case where it is determined as NO, the CPU 501 advances the processing to S1044.

In S1012, the CPU 501 issues a first scanning command to the CPU 421 of the image reading unit 200 and advances the processing to S1013. It should be noted that the first scanning command issued by the CPU 501 in S1012 is received by the image reading unit 200 in S2001 of FIG. 8 which will be described below.

Figure 9:
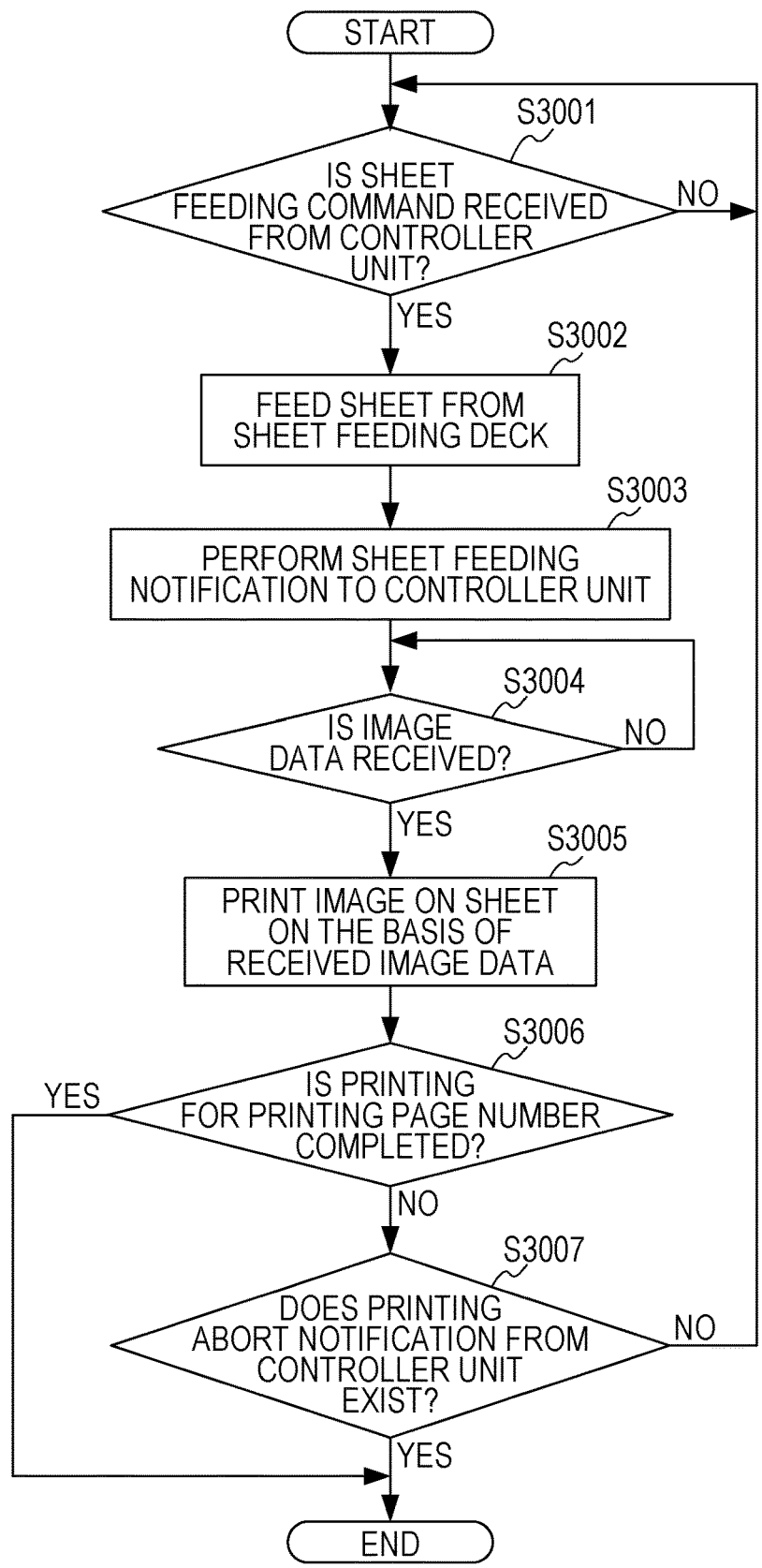
FIG. 9 is a flow chart for describing the control example according to the first exemplary embodiment.
Figure 12A:
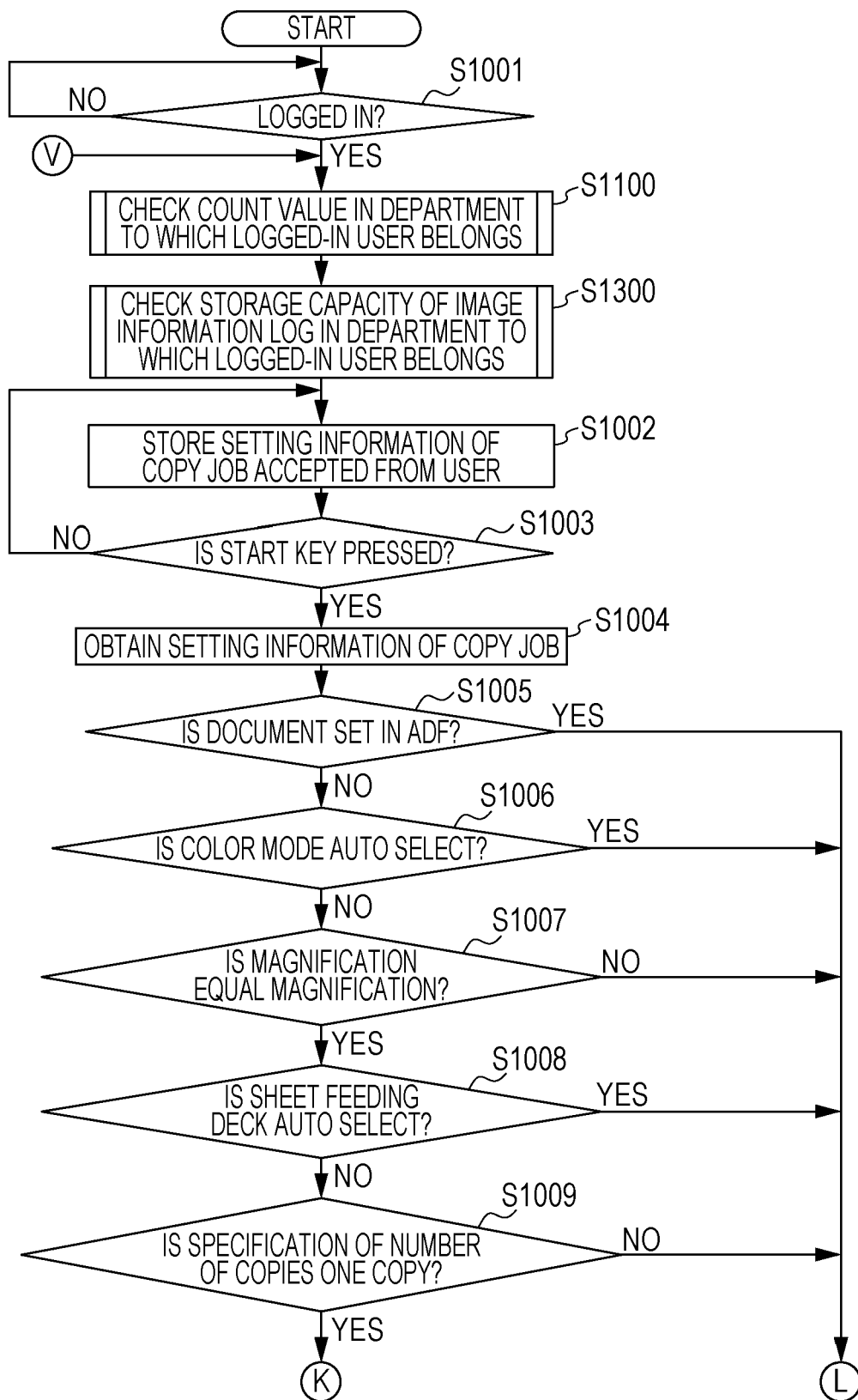
Figure 12B:
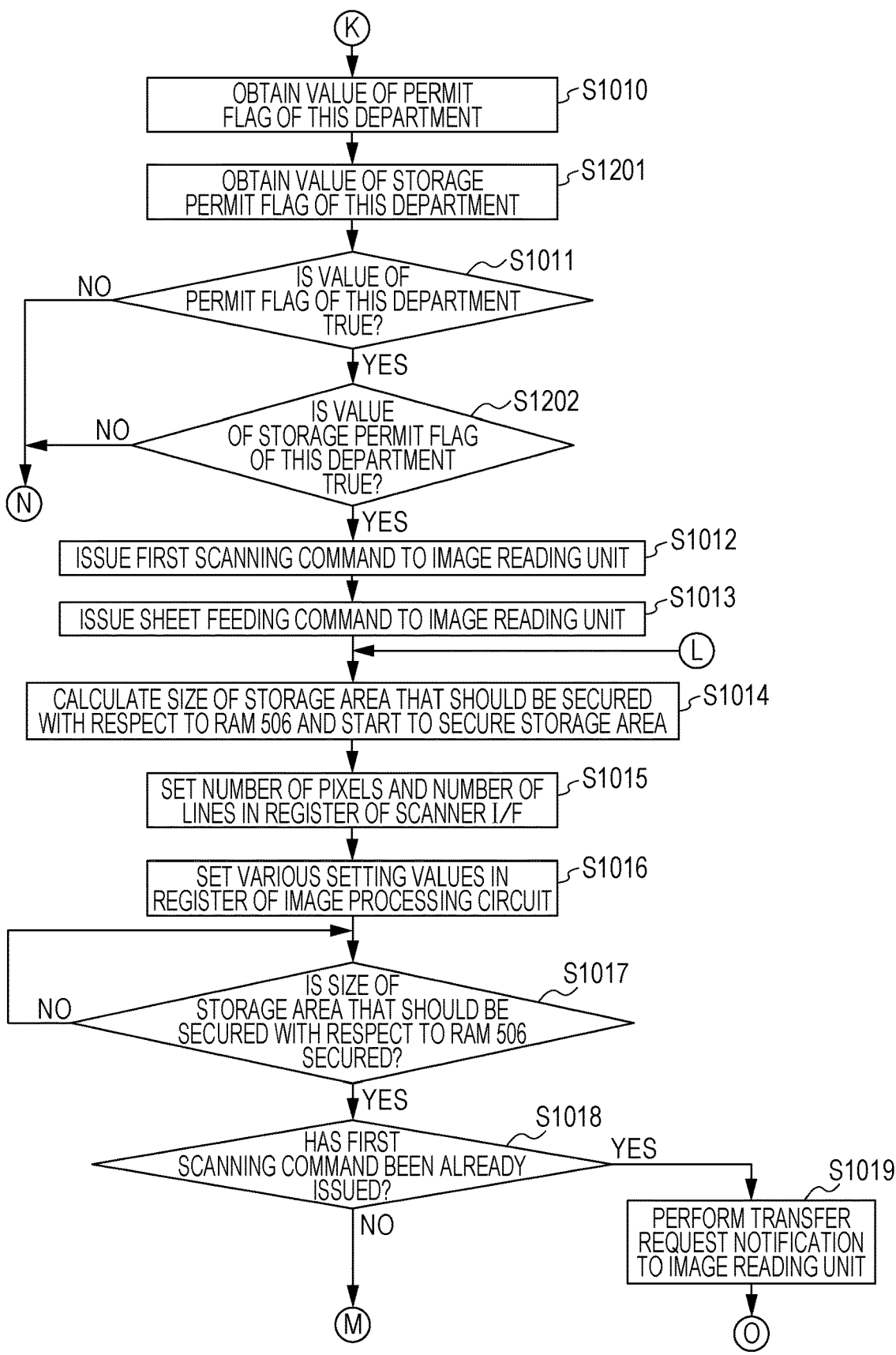
Figure 12D:
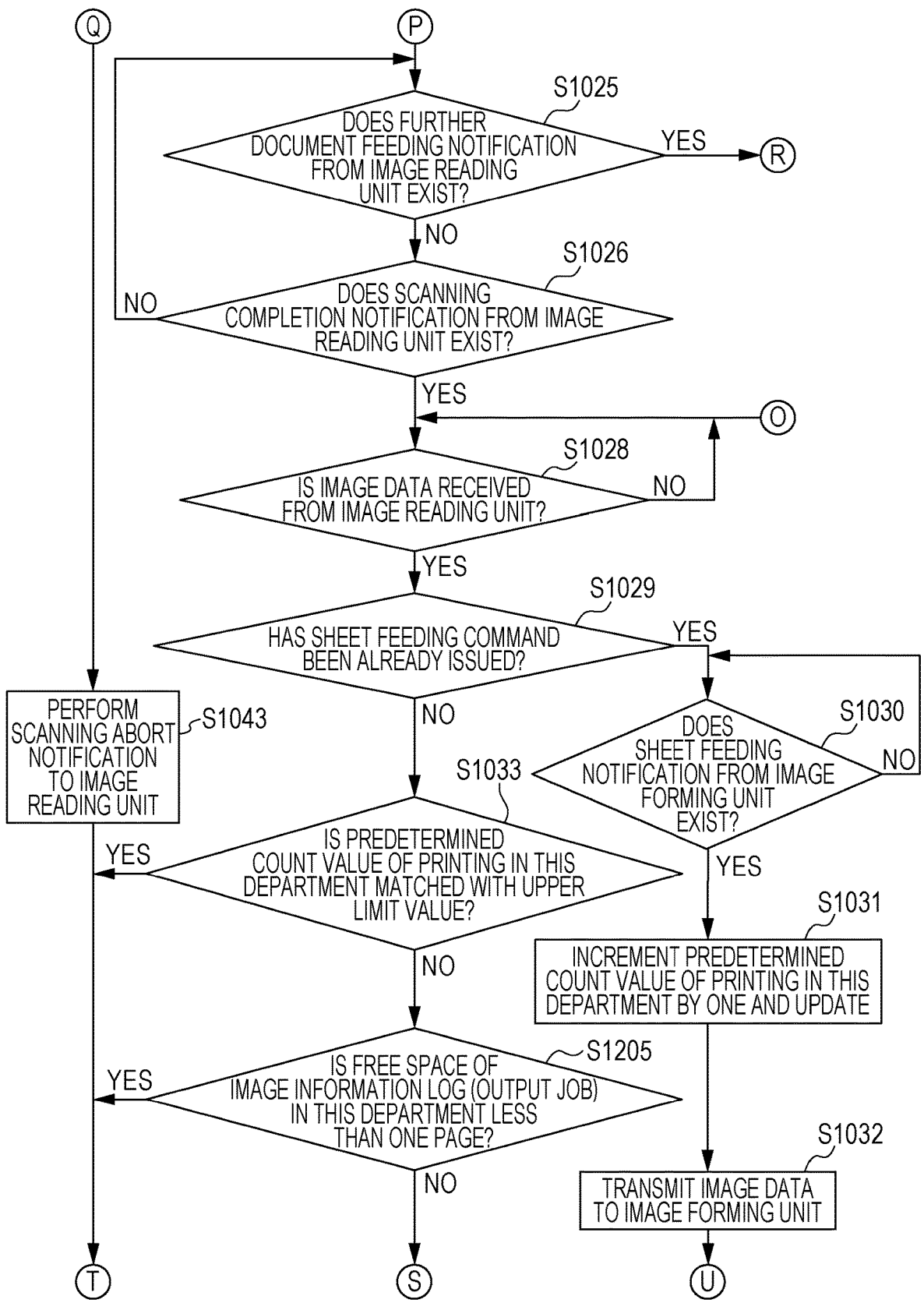
Figure 12E:
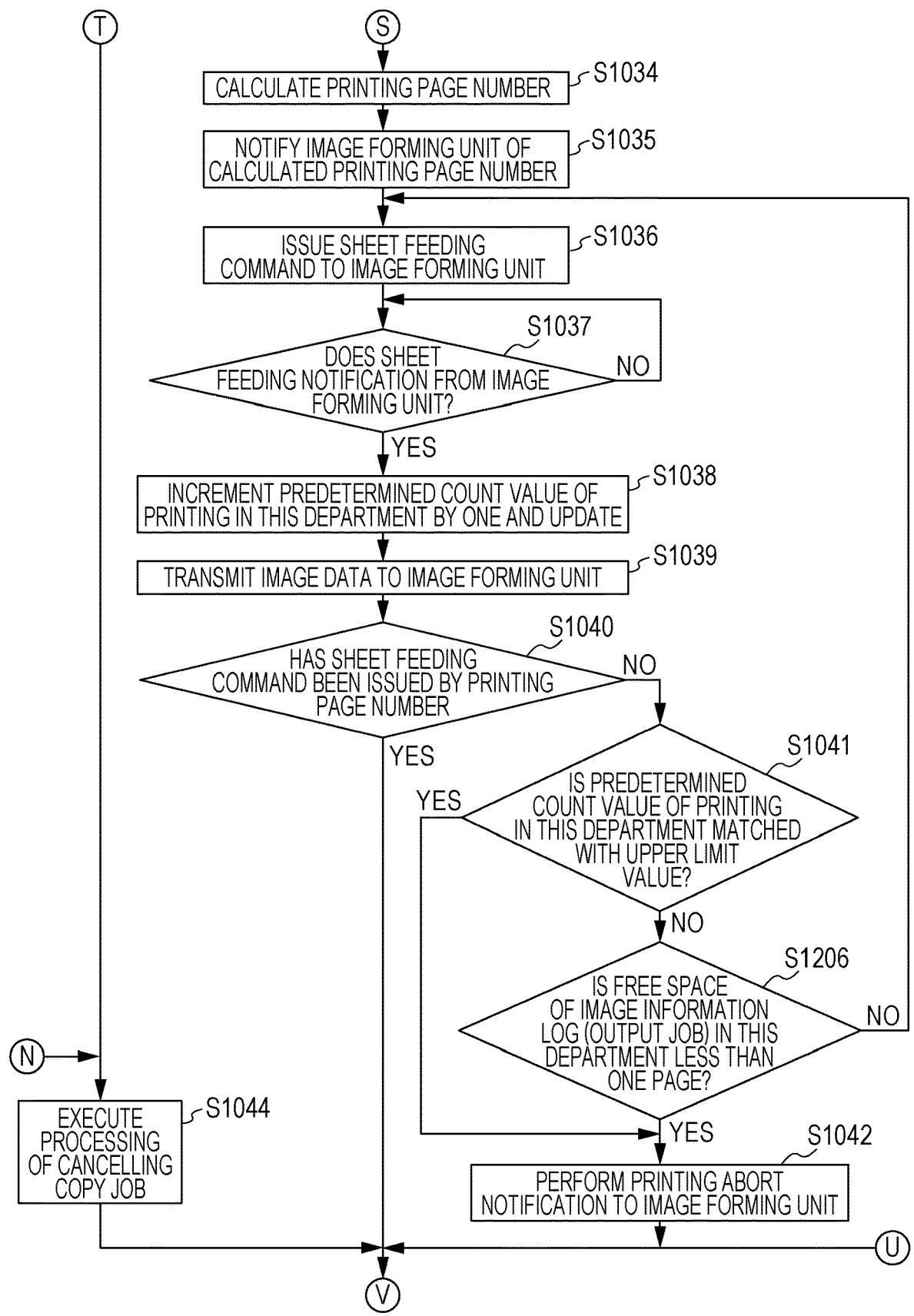

In S1013, the CPU 501 issues a sheet feeding command for feeding a sheet from the sheet feeding deck with respect to the CPU 601 of the image forming unit 600 and advances the processing to S1014. It should be noted that the sheet feeding command issued by the CPU 501 in S1013 is received by the image forming unit 600 in S3001 of FIG. 9 which will be described below.

In S1014, to store the image data generated by reading the image of the document, the CPU 501 calculates a size of the storage area that should be secured with respect to the RAM 506. Subsequently, the CPU 501 starts to secure the storage area with respect to the RAM 506 and advances the processing to S1015. It should be noted that the size of the storage area that should be secured to store the image data is calculated, for example, on the basis of the parameters such as the reading resolution, the magnification 713 (document size/output sheet size), the document size (reading size), and the color selection 712 (monochrome/color).

In S1015, the CPU 501 sets the number of pixels and the number of lines in the register 10000 of the scanner I/F 503 as illustrated in FIG. 10 and advances the processing to S1016.

In S1016, the CPU 501 sets various setting values (the color mode, the scaling factors in the X direction and the Y direction, the reading resolution, the output resolution, the rotation angle, the other function settings, and the like) in the register 11000 of the image processing circuit 502 as illustrated in FIG. 11 and advances the processing to S1017.

In S1017, the CPU 501 determines whether or not the storage area calculated in S1014 is secured in the RAM 506. When it is determined that the storage area is secured (that is, YES), the CPU 501 advances the processing to S1018. On the other hand, the CPU 501 repeats the processing in S1017 until it is determined that the storage area is secured. In a case where the storage area calculated in S1014 is not secured even when a predetermined time elapses, the processing may be advanced to S1044 to cancel the copy job. It should be noted that, until the storage area is secured, the image data of the scanned document is held by the image memory 429 of the image reading unit 200.

In S1018, the CPU 501 determines whether or not the first scanning command has been already issued with respect to the CPU 421 of the image reading unit 200. When it is determined that the first scanning command has been already issued (that is, YES), the CPU 501 advances the processing to S1019. On the other hand, in a case where it is determined as NO, the CPU 501 advances the processing to S10204.

In S1019, the CPU 501 performs a transfer request notification to the CPU 421 of the image reading unit 200 to transmit (transfer) the image data stored in the image memory 429 to the controller unit 500 and advances the processing to S1028.

In S1020, the CPU 501 determines whether or not a predetermined count value of the scanning in this department is matched with an upper limit value on the basis of the setting information of the copy job obtained in S1004 and the count value of the scanning in this department obtained in S1103 of FIG. 11. For example, in a case where the color scanning is specified to be executed in the setting of the copy job, the CPU 501 determines whether or not the count value of the scanning (color) in this department is matched with an upper limit value. For example, in a case where the monochrome scanning is specified to be executed in the setting of the copy job, the CPU 501 determines whether or not the count value of the scanning (monochrome) in this department is matched with an upper limit value. When it is determined that the values are matched (that is, YES), the CPU 501 advances the processing to S1043. On the other hand, in a case where it is determined as NO, the CPU 501 advances the processing to S1021.

In S1021, the CPU 501 issues a second scanning command to the CPU 421 of the image reading unit 200 and advances the processing to S1022. It should be noted that the second scanning command issued by the CPU 501 in S1021 is received by the image reading unit 200 in S2001 of FIG. 8 which will be described below.

In S1022, the CPU 501 determines whether or not a notification indicating that the document feeding is started (hereinafter will be referred to as a document feeding notification) exists. It should be noted that this document feeding notification is performed by the CPU 421 of the image reading unit 200 in S2009 of FIG. 8 which will be described below. When it is determined that the notification exists (that is, YES), the CPU 501 advances the processing to S1023. On the other hand, in a case where it is determined as NO, the CPU 501 advances the processing to S1027.

In S1023, the CPU 501 increments the predetermined count value of the scanning in this department which is stored in the HDD 509 by one to update and advances the processing to S1024. For example, in the setting of the copy job, in a case where the scanning is instructed to be executed in the A4 size and also in color, the CPU 501 increments the count value of the scanning (A4 size) and the count value of the scanning (color) in this department by one each to update. For example, in the setting of the copy job, in a case where the scanning is instructed to be executed in the B4 size and also in monochrome, the CPU 501 increments the count value of the scanning (B4 size) and the count value of the scanning (monochrome) in this department by one each to update.

In S1024, the CPU 501 determines whether or not the predetermined count value of the scanning in this department is matched with the upper limit value. When it is determined that the values are matched (that is, YES), the CPU 501 advances the processing to S1043. On the other hand, in a case where it is determined as NO, the CPU 501 advances the processing to S1025.

In S1025, the CPU 501 determines whether or not a further document feeding notification exists. It should be noted that this document feeding notification is performed by the CPU 421 of the image reading unit 200 in S2009 of FIG. 8 which will be described below. When it is determined that the notification exists (that is, YES), the CPU 501 returns the processing to S1023. On the other hand, in a case where it is determined as NO, the CPU 501 advances the processing to S1026.

In S1026, the CPU 501 determines whether or not a notification indicating that the scanning is completed (hereinafter will be referred to as a scanning completion notification) exists. It should be noted that the scanning completion notification is performed by the CPU 421 of the image reading unit 200 in S2016 of FIG. 8 which will be described below. When it is determined that the notification exists (that is, YES), the CPU 501 advances the processing to S1028. On the other hand, in a case where it is determined as NO, the CPU 501 returns the processing to S1025.

In S1027, the CPU 501 increments the predetermined count value of the scanning in this department which is stored in the HDD 509 by one to update and advances the processing to S1028.

In S1028, the CPU 501 determines whether or not the image data transmitted (transferred) from the image reading unit 200 is received. It should be noted that the image data received by the controller unit 500 in S1028 is transmitted by the image reading unit 200 in S2007 or S2015 of FIG. 8 which will be described below. When it is determined that the image data is received (that is, YES), the CPU 501 advances the processing to S1029. On the other hand, in a case where it is determined as NO, the CPU 501 repeats the processing in S1028 until the image data is received. It should be noted that, in a case where the image data is not received in S1028 even after an elapse of a predetermined time, the processing may be advanced to S1044 to cancel the copy job.

In S1029, the CPU 501 determines whether or not the sheet feeding command has been already issued to the CPU 601 of the image forming unit 600. When it is determined that the sheet feeding command has been already issued (that is, YES), the CPU 501 advances the processing to S1030. On the other hand, in a case where it is determined as NO, the CPU 501 advances the processing to S1033.

In S1030, the CPU 501 determines whether or not a notification indicating that feeding of a sheet from the sheet feeding deck is started (hereinafter will be referred to as a sheet feeding notification) exists. It should be noted that the sheet feeding notification is performed by the CPU 601 of the image forming unit 600 in S3003 of FIG. 9 which will be described below. When it is determined that the notification exists (that is, YES), the CPU 501 advances the processing to S1031. On the other hand, in a case where it is determined as NO, the CPU 501 repeats the processing in S1030 until the notification exists. It should be noted that, in a case where the sheet feeding notification does not exist in S1030 even after an elapse of a predetermined time, the processing may be advanced to S1044 to cancel the copy job.

In S1031, the CPU 501 increments the predetermined count value of the printing in this department which is stored in the HDD 509 by one to update and advances the processing to S1032. For example, in the setting of the copy job, in a case where the color printing is specified to be executed, the CPU 501 increments the count value of the printing (color) in this department by one to update. For example, in the setting of the copy job, in a case where the monochrome printing is specified to be executed, the CPU 501 increments the count value of the printing (monochrome) in this department by one to update.

In S1032, the CPU 501 transmits the image data to the image forming unit 600 stored in the RAM 506. It should be noted that S1032, the image data transmitted by the CPU 501 is received by the image forming unit 600 in S3004 of FIG. 9 which will be described below. After the processing in S1032, the processing is returned to S1100 of FIG. 11, and the subsequent processings are performed.

In S1033, the CPU 501 determines whether or not a predetermined count value of the scanning in this department is matched with an upper limit value on the basis of the setting information of the copy job obtained in S1004 and the total count value of the printing in this department obtained in S1103 of FIG. 11. For example, in the setting of the copy job, in a case where the color printing is specified to be executed, the CPU 501 determines whether or not a count value of the printing (color) in this department is matched with an upper limit value. For example, in the setting of the copy job, in a case where the monochrome printing is specified to be executed, the CPU 501 determines whether or not a count value of the printing (monochrome) in this department is matched with an upper limit value. When it is determined that the values are matched (that is, YES), the CPU 501 advances the processing to S1044. On the other hand, in a case where it is determined as NO, the CPU 501 advances the processing to S1034. In S1034, the CPU 501 calculates the printing pages on the basis of the setting information of the copy job obtained in S1004 and the number of pages of the image data received in S1028 and advances the processing to S1015. For example, in a case where the page layout of the printing setting is "1-in-1 (standard)" and also the number of pages of the image data is 12 pages, the CPU 501 calculates the printing pages as 12 pages. For example, in a case where the page layout of the printing setting is "2-in-1" and also the number of pages of the image data is 12 pages, the CPU 501 calculates the printing pages as 6 pages. For example, in a case where the page layout of the printing setting is "4-in-1" and also the number of pages of the image data is 12 pages, the CPU 501 calculates the printing pages as 3 pages.

In S1035, the CPU 501 notifies the CPU 601 of the image forming unit 600 of the number of printing pages calculated in S1034 and advances the processing to S1036.

In S1036, the CPU 501 issues a command for feeding a sheet from the sheet feeding deck with respect to the CPU 601 of the image forming unit 600 and advances the processing to S1037. It should be noted that the sheet feeding command issued in S1013 by the CPU 501 is received by the image forming unit 600 in S3001 of FIG. 9 which will be described below.

In S1037, the CPU 501 determines whether or not the sheet feeding notification exists. It should be noted that this sheet feeding notification is performed by the CPU 601 of the image forming unit 600 in S3003 of FIG. 9 which will be described below. When it is determined that the notification exists (that is, YES), the CPU 501 advances the processing to S1038. On the other hand, in a case where it is determined as NO, the CPU 501 repeats the processing in S1037 until the sheet feeding notification exists. It should be noted that, in a case where the sheet feeding notification does not exist even after an elapse of a predetermined time, the processing may be advanced to S1044 to cancel the copy job.

In S1038, the CPU 501 increments the predetermined count value of the printing in this department which is stored in the HDD 509 by one to update and advances the processing to S1039.

In S1039, the CPU 501 transmits the image data stored in the HDD 509 to the image forming unit 600 and advances the processing to S1040. It should be noted that, in a case where the image data received in S1028 is stored in the HDD 509 in a state of being compressed by the compression and decompression unit 510, after the compressed image data is decompressed by the compression and decompression unit 510, the CPU 501 transmits (transfers) this image data to the image forming unit 600. It should be noted that the image data transmitted in S1039 by the CPU 501 is received by the image forming unit 600 in S3004 of FIG. 9 which will be described below.

In S1040, the CPU 501 determines whether or not the sheet feeding command for the number of printing pages calculated in S1034 has been issued with respect to the CPU 601 of the image forming unit 600. When it is determined that the sheet feeding command has been issued (that is, YES), the CPU 501 returns the processing to S1100 in FIG. 11 and performs the subsequent processing. On the other hand, in a case where it is determined as NO, the CPU 501 advances the processing to S1041.

In S1041, the CPU 501 determines whether or not a predetermined count value of the printing in this department is matched with an upper limit value on the basis of the setting information of the copy job obtained in S1004 and the total count value of the printing in this department obtained in S1103 of FIG. 11. When it is determined that the values are matched (that is, YES), the CPU 501 advances the processing to S1042. On the other hand, in a case where it is determined as NO, the CPU 501 returns the processing to S1036.

In S1042, the CPU 501 performs a notification indicating that the printing is to be aborted (hereinafter will be referred to as a printing abort notification) with respect to the CPU 601 of the image forming unit 600. After the processing in S1042, the processing is returned to S1100 of FIG. 11, and the subsequent processings are performed.

In S1043, the CPU 501 performs a notification indicating that the scanning is to be aborted (hereinafter will be referred to as a scanning abort notification) with respect to the CPU 421 of the image reading unit 200 and advances the processing to S1044.

In S1044, the CPU 501 executes processing of cancelling the copy job. After the processing in S1044, the processing is returned to S1100, and the subsequent processings are performed.

The details of the series of processing for accepting the execution instruction of the copy job and executing the copy job where the execution instruction has been accepted in the MFP 1000 according to the first exemplary embodiment has been described above.

Figure 8:
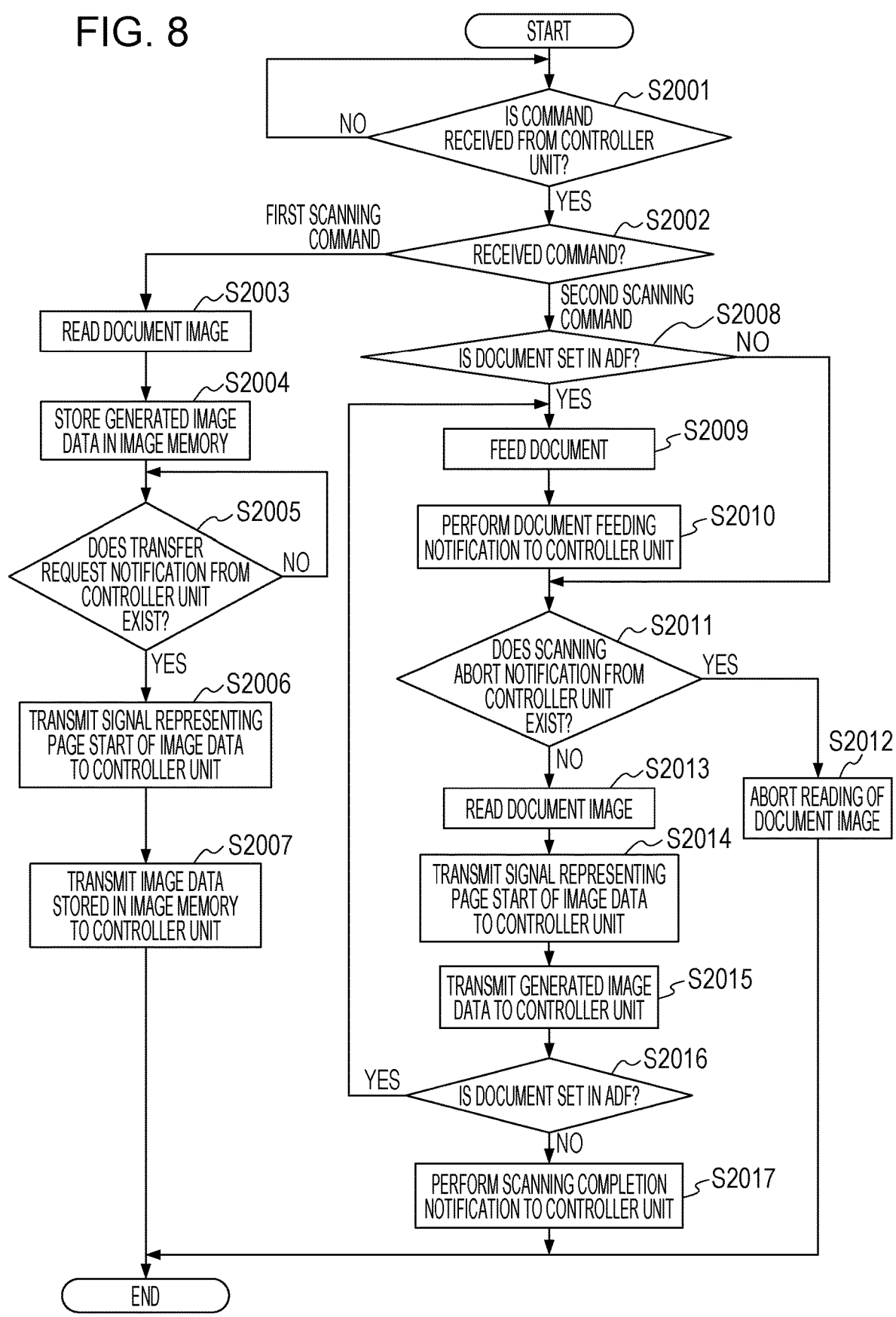
FIG. 8 is a flow chart for describing the control example according to the first exemplary embodiment.

Next, with reference to a flow chart of FIG. 8, details of a series of processings will be described in which the first scanning command or the second scanning command is received, and the scanning is executed according to this reception in the MFP 1000 according to the first exemplary embodiment. This processing is performed while the CPU 421 of the image reading unit 200 executes the control program read out from the ROM 422 and decompressed to the RAM 423. It should be noted that this processing is started in a state in which the document is set on the document tray 30 or the platen glass 202.

In S2001, the CPU 421 determines whether or not the command is received. It should be noted that the command received by the CPU 421 in S2001 is the first scanning command issued by the controller unit 500 in S1012 of FIG. 5B described above, the second scanning command issued by the controller unit 500 in S1021 of FIG. 5B, or the like. When it is determined that the command is received (that is, YES), the CPU 421 advances the processing to S2002. On the other hand, in a case where it is determined as NO, the CPU 421 repeats the processing in S2001 until the command is received.

In S2002, the CPU 421 determines whether the received command is the first scanning command or the second scanning command. When it is determined that the command is the first scanning command, the CPU 421 advances the processing to S2003. On the other hand, in a case where it is determined that the command is the second scanning command, the CPU 421 advances the processing to S2008.

In S2003, the CPU 421 reads the image of the document to generate the image data and advances the processing to S2004.

In S2004, the CPU 421 stores the image data generated by the scanning executed in S2003 in the image memory 429 and advances the processing to S2005.

In S2005, the CPU 421 determines whether or not the transfer request notification exists. It should be noted that this transfer request notification is performed by the CPU 501 of the controller unit 500 in S1019 of FIG. 5B described above.

In S2006, the CPU 421 transmits the signal representing the page start of the image data to the controller unit 500 to transmit (transfer) the image data of the scanned document to the controller unit 500 and advances the processing to S2007.

In S2007, the CPU 421 transmits the image data of the scanned document to the controller unit 500. It should be noted that, in S2007, the CPU 421 reads out the image data stored in the image memory 429 and transmits this image data to the controller unit 500. Subsequently, after the processing in S2007, the series of processings related to FIG. 8 is ended.

In S2008, the CPU 421 determines whether or not the document is set in the ADF. It should be noted that a state in which the document is set in the ADF can be determined on the basis of the detection by the document detection sensor (not illustrated). When it is determined that the document is set (that is, YES), the CPU 421 advances the processing to S2009. On the other hand, in a case where it is determined as NO, the CPU 421 advances the processing to S2011.

In S2009, the CPU 421 controls the operations of the feeding roller 1 and the like to feed the uppermost document 32 of the sheaf of the documents set on the document tray 30 and advances the processing to S2010.

In S2010, the CPU 421 performs the notification indicating that the document feeding is started (document feeding notification) with respect to the CPU 501 of the controller unit 500 and advances the processing to S2011.

In S2011, the CPU 421 determines whether or not the scanning abort notification exists. It should be noted that this scanning abort notification is performed by the CPU 501 of the controller unit 500 in S1043 of FIG. 5C described above. When it is determined that the notification exists (that is, YES), the CPU 421 advances the processing to S2012. On the other hand, in a case where it is determined as NO, the CPU 421 advances the processing to S2013.

In S2012, the CPU 421 performs control so as to abort the reading of the image of the document. After the processing in S2012, the series of processings related to FIG. 8 is ended.

In S2013, the CPU 421 reads the image of the document to generate the image data and advances the processing to S2014. In 2014, the CPU 421 transmits the signal representing the page start of the image data to the controller unit 500 to transmit (transfer) the image data of the scanned document to the controller unit 500 and advances the processing to S2015.

In S2015, the CPU 421 transmits the image data of the scanned document to the controller unit 500 and advances the processing to S2016. It should be noted that, as being different from S2007 described above, the CPU 421 directly transmits (transfers) the image data of the document to the controller unit 500 in S2015 without being stored in the image memory 429.

In S2016, the CPU 421 determines whether or not the document is set in the ADF. It should be noted that a state in which the document is set in the ADF can be determined on the basis of the detection by the document detection sensor (not illustrated). When it is determined that the document is set (that is, YES), the CPU 421 advances the processing to S2009. On the other hand, in a case where it is determined as NO, the CPU 421 advances the processing to S2017.

In S2017, the CPU 421 performs a notification indicating that the scanning is completed (scanning completion notification) with respect to the CPU 501 of the controller unit 500. After the processing in S2017, the series of processings related to FIG. 8 is ended.

The details of the series of processings for executing the scanning in accordance with the reception of the first scanning command or the second scanning command in the MFP 1000 according to the first exemplary embodiment have been described above.

Next, will be described with reference to a flow chart illustrated in FIGS. 7A and 7B, details of a series of processings for receiving a print command and printing the image on the sheet in accordance with this reception in the MFP 1000 according to the first exemplary embodiment. This processing is performed while the CPU 601 of the image forming unit 600 executes the control program read out from the ROM 507 or the HDD 509 and decompressed to the RAM 506.

In S3001, the CPU 601 determines whether or not the sheet feeding command is received. It should be noted that the sheet feeding command received in S3001 by the CPU 601 is issued by the controller unit 500 in S1013 of FIG. 5B or S1036 of FIG. 5D described above. When it is determined that the sheet feeding command is received (that is, YES), the CPU 601 advances the processing to S3002. On the other hand, in a case where it is determined as NO, the CPU 601 repeats the processing in S3001 until the sheet feeding command is received.

In S3002, the CPU 601 performs control so as to feed the sheet for printing from the sheet feeding deck (351 to 354, 350) specified by the user by using the sheet selection 714 or the sheet feeding deck (351 to 354) determined by the auto select and advances the processing to S3003. At this time, the sheet 301 fed in S3002 is conveyed to a position short of the marking unit 603. Subsequently, once the sheet 301 is conveyed to the position short of the marking unit 603, until the image data is received in S3004 which will be described below, the CPU 601 performs control such that buffering of the sheet 301 is performed at the position short of the marking unit 603.

In S3003, the CPU 601 performs a notification indicating that the sheet feeding is started with respect to the CPU 501 of the controller unit 500 (sheet feeding notification) and advances the processing to S3004.

In S3004, the CPU 601 determines whether or not the image data is received from the controller unit 500. It should be noted that the image data received in S3004 by the CPU 601 is transmitted (transferred) by the controller unit 500 in S1032 or S1039 of FIG. 5D described above. When it is determined that the image data is received (that is, YES), the CPU 601 advances the processing to S3005. At this time, the CPU 601 performs control such that the conveyance of the sheet 301 buffered at the position short of the marking unit 603 is resumed. On the other hand, in a case where it is determined as NO, the CPU 601 repeats the processing in S3004 until the sheet feeding command is received. It should be noted that, in a case where the image data is not received in S3004 even after an elapse of a predetermined time, the series of processings related to FIG. 9 may be ended.

In S3005, the CPU 601 performs control so as to print the image on the sheet 301 on the basis of the image data received in S3004 and advances the processing to S3006.

Figure 5D:
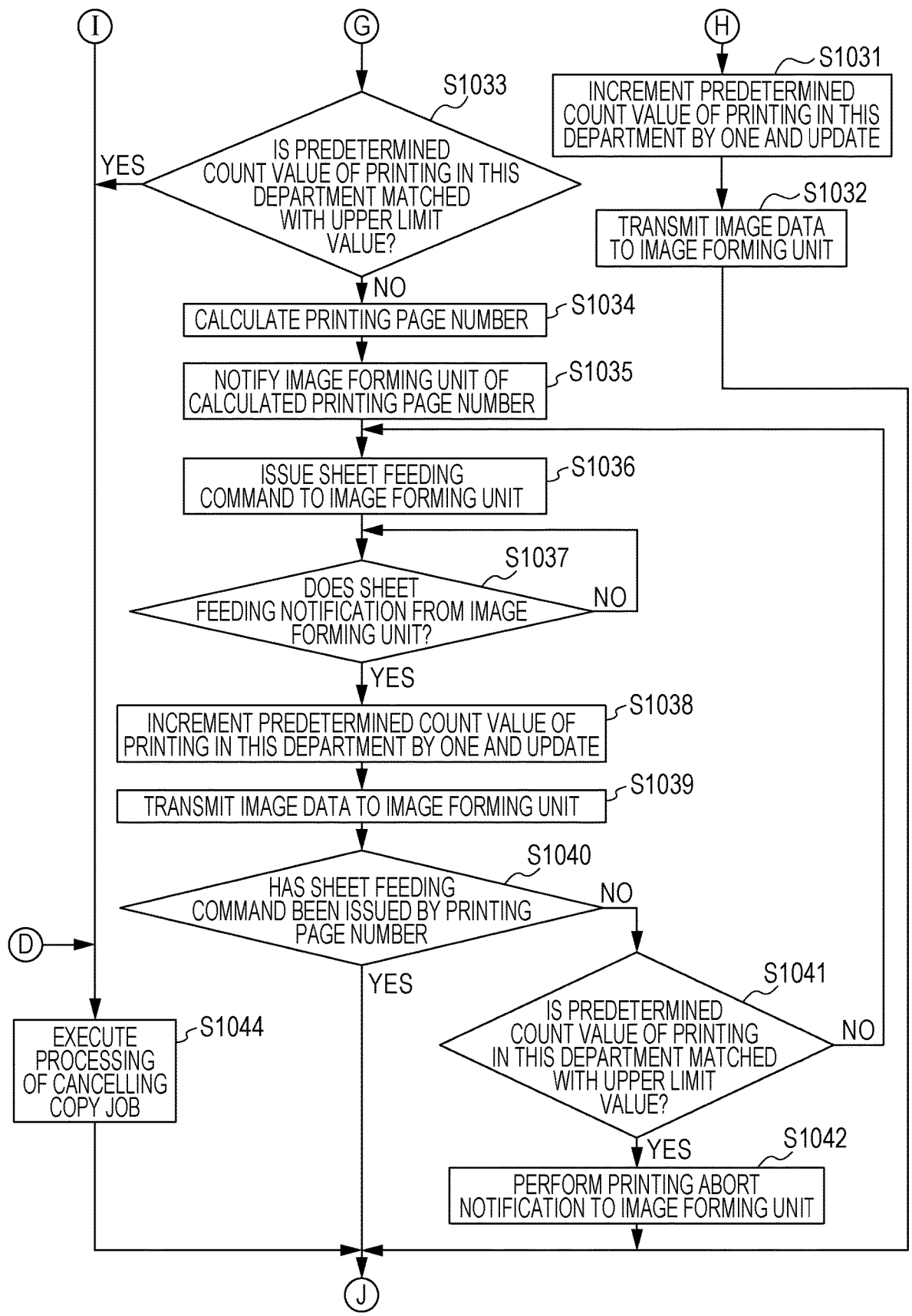

In S3006, the CPU 601 determines whether or not the printing for the number of printing pages calculated in S1034 of FIG. 5D described above is completed. When it is determined that the printing is completed (that is, YES), the CPU 601 ends the series of processings related to FIG. 9. On the other hand, in a case where it is determined as NO, the CPU 601 advances the processing to S3007.

In S3007, the CPU 601 determines whether or not the printing abort notification exists. It should be noted that this printing abort notification is performed by the CPU 501 of the controller unit 500 in S1042 of FIG. 5D described above. When it is determined that the notification exists (that is, YES), the CPU 421 ends the series of processings related to FIG. 9. On the other hand, in a case where it is determined as NO, the CPU 421 returns the processing to S3001.

The details of the series of processings for printing the image on the sheet in accordance with the reception of the print command in the MFP 1000 according to the first exemplary embodiment have been described above.

As described above, before the storage area for storing the scanning image data is secured in the RAM 506, the controller unit 500 issues the command for starting to feed the sheet from the feeding unit 604. Subsequently, the image forming unit 600 starts to feed the sheet from the feeding unit 604 in response to the reception of this command. As a result, for example, in a case where the image of the document is read, the time (FCOT) until the image is output to the sheet on the basis of the image data generated by reading the document can be shortened.

Second Exemplary Embodiment

According to the first exemplary embodiment described above, the case has been described where the count values in the department to which the logged-in user belongs are checked when the copy job is executed.

On the other hand, the image information log as history information of the input job is stored in the HDD 509 in accordance with the execution of the scanning in a case where the copy job is executed, and the image information log as history information of the output job is stored in the HDD 509 in accordance with the execution of the printing. It should be noted that an upper limit capacitance for storing the image information log (input job) and an upper limit capacitance for storing the image information log (output job) are respectively set in the HDD 509 for each department.

In view of the above, according to the second exemplary embodiment, a case will be hereinafter described where the free space of the image information log in this department is checked in addition to the checking of the count values in the department to which the logged-in user belongs when the copy job is executed.

Part of the series of processings for accepting the execution instruction of the copy job and executing the copy job where the execution instruction is received in the MFP 1000 according to the second exemplary embodiment is different from the processings according to the first exemplary embodiment (control example described above with reference to FIGS. 5A to 5D). Thus, the processings different from those of the first exemplary embodiment will be mainly described with reference to FIGS. 12A to 12E. It should be noted that processings common to the first exemplary embodiment and the second exemplary embodiment are assigned with the same step numbers, and detailed descriptions thereof will be omitted.

Figure 13:
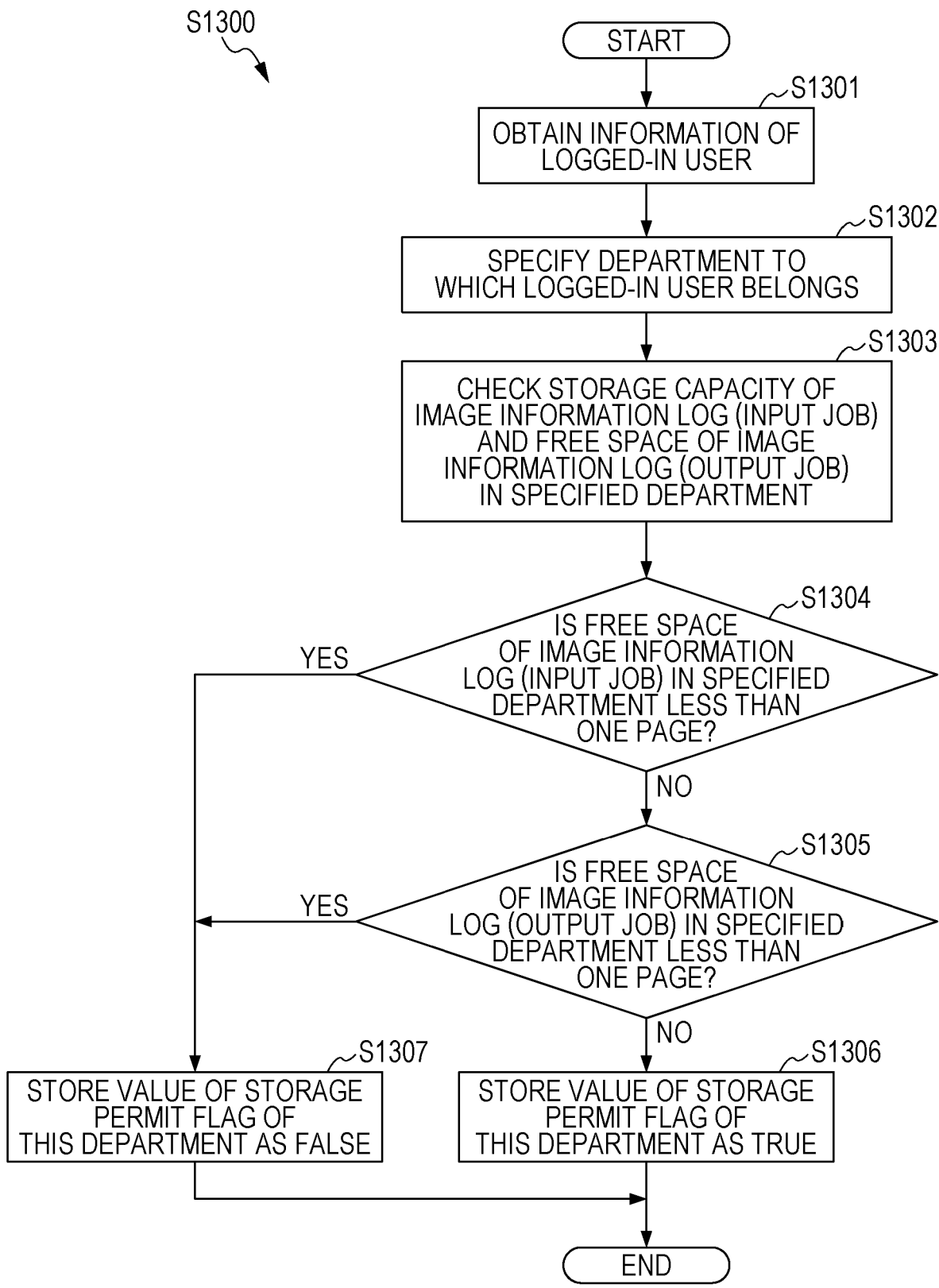
FIG. 13 is a flow chart for describing the control example according to the second exemplary embodiment.

According to the second exemplary embodiment, after the processing in S1100 described above in FIG. 6, the processing is advanced to S1300 of FIG. 13 which will be described below.

In the MFP 1000 according to the second exemplary embodiment, the series of processing for checking the free space of the image information log in the department to which the logged-in user belongs will be described in detail with reference to the flow chart illustrated in FIG. 6. This processing is executed while the CPU 501 of the controller unit 500 executes the control program read out from the ROM 507 or the HDD 509 and decompressed to the RAM 506.

In S1301, the CPU 501 obtains the information of the logged-in user in S1001 (for example, the user ID, the user name, the password, and the like) and advances the processing to S1302.

In S1302, the CPU 501 refers to the affiliation correspondence table 7000 illustrated in FIG. 7A which is stored in the HDD 509 to specify the department to which the logged-in user belongs on the basis of the information of the user obtained in S1301 and advances the processing to S1303.

In S1303, the CPU 501 obtains the free space of the HDD 509 for storing the image information log (input job) and the free space of the HDD 509 for storing the image information log (output job) in the department specified in S1302 and advances the processing to S1304.

In S1304, the CPU 501 determines whether or not the free space of the HDD 509 for storing the image information log (input job) in the department specified in S1302 is less than one page. For example, in a case where the image information log is set to be stored while a file format is JPEG, a resolution is 300 dpi×300 dpi, a size is A4, and a mode is a color mode, a size of the image data for one page based on these settings is assumed to be N (M bytes). In this case, in S1304, the CPU 501 determines whether or not the free space of the HDD 509 for storing the image information log (input job) in the department specified in S1302 is less than a predetermined size (that is, less than N (M bytes)).

When it is determined that the free space is less than one page (that is, YES), the CPU 501 advances the processing to S1307. On the other hand, in a case where it is determined as NO, the CPU 501 advances the processing to S1305.

In S1305, the CPU 501 determines whether or not the free space of the HDD 509 for storing the image information log (output job) in the department specified in S1302 is less than one page. When it is determined that the free space is less than one page (that is, YES), the CPU 501 advances the processing to S1307. On the other hand, in a case where it is determined as NO, the CPU 501 advances the processing to S1306.

In S1306, the CPU 501 stores a value of a storage permit flag of the department specified in S1302 as "TRUE" in the HDD 509. After the processing in S1306, the processing is advanced to S1002 of FIG. 12A.

In S1307, the CPU 501 stores the value of the storage permit flag of the department specified in S1302 as "FALSE" in the HDD 509. After the processing in S1307, the processing is advanced to S1002 of FIG. 12A.

Here, descriptions will be given of the flow charts of FIGS. 12A to 12E (processings in S1002 and subsequent steps) again.

In S1201, the CPU 501 refers to the value of the storage permit flag stored in the HDD 509 to obtain the value of the storage permit flag of the department to which the logged-in user in S1001 belongs (hereinafter referred to as this department) and advances the processing to S1011.

In S1202, the CPU 501 determines whether or not the value of the storage permit flag of this department which is obtained in S1010 is "TRUE". When it is determined as "TRUE" (that is, YES), the CPU 501 advances the processing to S1012. On the other hand, in a case where it is determined as NO, the CPU 501 advances the processing to S1044.

In S1203, the CPU 501 determines whether or not the free space of the HDD 509 for storing the image information log (input job) in this department is less than one page. When it is determined that the free space is less than one page (that is, YES), the CPU 501 advances the processing to S1043. On the other hand, in a case where it is determined as NO, the CPU 501 advances the processing to S1021.

In S1204, the CPU 501 determines whether or not the free space of the HDD 509 for storing the image information log (input job) in this department is less than one page. When it is determined that the free space is less than one page (that is, YES), the CPU 501 advances the processing to S1043. On the other hand, in a case where it is determined as NO, the CPU 501 advances the processing to S1025.

In S1205, the CPU 501 determines whether or not the free space of the HDD 509 for storing the image information log (output job) in this department is less than one page. When it is determined that the free space is less than one page (that is, YES), the CPU 501 and advances the processing to S1044. On the other hand, in a case where it is determined as NO, the CPU 501 advances the processing to S1034.

In S1206, the CPU 501 determines whether or not the free space of the HDD 509 for storing the image information log (output job) in this department is less than one page. When it is determined that the free space is less than one page (that is, YES), the CPU 501 and advances the processing to S1042. On the other hand, in a case where it is determined as NO, the CPU 501 advances the processing to S1036.

The above-described explanations relate to the details of the processings different from the processings according to the first exemplary embodiment among the series of processings for accepting the execution instruction of the copy job and executing the copy job where the execution instruction is received in the MFP 1000 according to the second exemplary embodiment.

Various examples and exemplary embodiments of the present disclosure have been described above, but the gist and the scope of the present disclosure should not be limited to the specific descriptions in the present specification for a person skilled in the art.

For example, according to the present exemplary embodiment, the case has been described where the CPU 501 does not issue the first scanning command in a case where the document is set in the ADF 100, but the configuration is not limited to this. Even in a case where the document is set in the ADF 100, the CPU 501 may issue the first scanning command when the copy settings such as the color mode, the magnification, and the sheet feeding deck satisfy a predetermined condition. In addition, the case has been described where the CPU 501 issues the first scanning command in a case where the copy settings such as the color mode, the magnification, and the sheet feeding deck satisfy the predetermined condition, but the configuration is not limited to this. A further restriction may be set such that the CPU 501 can issue the first scanning command in a case where the other copy settings such as the specification of the number of copies and settings of the reading resolution and the post processings satisfy a predetermined condition. As an alternative to the above-described configuration, a mode in which the copy settings such as the color mode, the magnification, and the sheet feeding deck are fixed (referred to as an FCOT shortened mode) can be directly specified from the operation unit 505 by the user. The CPU 501 may issue the first scanning command in a case where the FCOT shortened mode is specified by the user.

In addition, according to the present exemplary embodiment, the descriptions have been given while the PC is exemplified as the external apparatus, but a mobile information terminal such as a PDA or a smart phone, a network connecting device, an external dedicated-use apparatus or the like may be used instead.

In addition, according to the present exemplary embodiment, the CPU 501 of the controller unit 500 of the MFP 1000 functions as the main body for the above-described various controls, but a configuration may be adopted in which a part or all of the above-described various controls can be executed by a printing control apparatus such as an external controller corresponding to a separate package from the MFP 1000.

In addition, according to the present exemplary embodiment, the case has been described in which the controller unit 500 of the MFP 1000 is provided with the CPU 501, the image reading unit 200 is provided with the CPU 421, and the image forming unit 600 is provided with the CPU 601, but the configuration is not limited to this. As long as the CPU 501 of the controller unit 500 can control the image reading unit 200 and the image forming unit 600 in an overall manner, the configuration in which the image reading unit 200 is provided with the CPU 421 is not a necessary configuration, and also, the configuration in which the image forming unit 600 is provided with the CPU 601 is not a necessary configuration.

Various examples and exemplary embodiments of the present disclosure have been described above, but the gist and the scope of the present disclosure should not be limited to the specific descriptions in the present specification for a person skilled in the art.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a reader that reads document sheets to generate image data;
a sheet holding unit
a feeder that feeds a sheet from the sheet holding unit;
a printer that prints an image based on the generated image data on the fed sheet; and
a controller,
wherein the controller causes, after receiving an execution instruction of a copy process, the feeder to start to feed the sheet from the sheet holding unit, and then determines, based on a number of the sheets on which the image has been printed, whether to execute the copy process, and
wherein the controller executes, based on the received execution instruction and the determination that the controller executes the copy process, the copy process in which the reader reads a document sheet to generate image data and the printer prints an image based on the generated image data on the sheet fed by the feeder from the sheet holding unit.

2. The image processing apparatus according to claim 1, wherein the received execution instruction is a first time execution instruction after the number of the sheets has been obtained.

3. The image processing apparatus according to claim 1, further comprising a user interface,
wherein the user interface receives a copy setting, and
wherein the user interface receives the copy setting from when the number of the sheets is obtained to when the execution instruction is received.

4. The image processing apparatus according to claim 1, wherein the controller determines, on the basis that the number of the sheets is a predetermined number, to not execute the copy process, and
wherein the controller determines, on the basis that the number of the sheets is less than the predetermined number, to execute the copy process based on the received execution instruction.

5. The image processing apparatus according to claim 4, wherein the predetermined number is set in associated with a user.

6. A control method for controlling an image processing apparatus including a feeder and a sheet holding unit, the control method comprising:
reading document sheets to generate image data;
printing an image based on the generated image data on the sheet fed by the feeder from the sheet holding unit;

causing, after receiving an execution instruction of a copy process, the feeder to start to feed the sheet from the sheet holding unit, and then determining based on a number of the sheets on which the image has been printed, whether to execute the copy process; and executing, based on the received execution instruction and the determination that the copy process is executed, the copy process for reading a document sheet to generate image data and for printing an image based on the generated image data on the sheet fed by the feeder from the sheet holding unit.

7. A non-transitory computer readable storage medium storing a computer program for causing an image processing apparatus including a feeder and a sheet holding unit to perform a control method, the control method comprising:

reading document sheets to generate image data;

printing an image based on the generated image data on the sheet fed by the feeder from the sheet holding unit;

causing, after receiving an execution instruction of a copy process, the feeder to start to feed the sheet from the sheet holding unit, and then determining, based on a number of the sheets on which the image has been printed, whether to execute the copy process; and executing, based on the received execution instruction and the determination that the copy process is executed, the copy process for reading a document sheet to generate image data and for printing an image based on the generated image data on the sheet fed by the feeder from the sheet holding unit.

* * * * *